(12) United States Patent
Kitahara et al.

(10) Patent No.: US 7,458,001 B2
(45) Date of Patent: Nov. 25, 2008

(54) SEQUENTIAL PATTERN EXTRACTING APPARATUS

(75) Inventors: Youichi Kitahara, Fuchu (JP); Shigeaki Sakurai, Tokyo (JP); Ken Ueno, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 403 days.

(21) Appl. No.: 11/387,773

(22) Filed: Mar. 24, 2006

(65) Prior Publication Data

US 2007/0055665 A1   Mar. 8, 2007

(30) Foreign Application Priority Data

Aug. 1, 2005   (JP) .............................. 2005-222808

(51) Int. Cl.
*G01R 31/28* (2006.01)
(52) U.S. Cl. ..................................... 714/738
(58) Field of Classification Search .................. 714/738
See application file for complete search history.

(56) References Cited

U.S. PATENT DOCUMENTS

| | | | |
|---|---|---|---|
| 5,485,471 A * | 1/1996 | Bershteyn | 714/739 |
| 5,794,209 A | 8/1998 | Agrawal et al. | |
| 5,819,266 A | 10/1998 | Agrawal et al. | |
| 6,061,682 A | 5/2000 | Agrawal et al. | |
| 6,449,743 B1 * | 9/2002 | Hosokawa | 714/738 |
| 6,473,757 B1 | 10/2002 | Garofalakis et al. | |
| 6,658,616 B1 * | 12/2003 | Chang et al. | 714/728 |
| 6,766,473 B2 * | 7/2004 | Nozuyama | 714/33 |
| 6,836,867 B2 * | 12/2004 | Yonetoku | 714/738 |
| 2002/0178155 A1 | 11/2002 | Sakurai | |
| 2004/0186835 A1 | 9/2004 | Sakurai | |
| 2005/0246161 A1 | 11/2005 | Sakurai | |
| 2006/0129554 A1 | 6/2006 | Suyama et al. | |

FOREIGN PATENT DOCUMENTS

| | | |
|---|---|---|
| JP | 09-251467 | 9/1997 |
| JP | 2004-110327 | 4/2004 |
| JP | 2004-287798 | 10/2004 |
| JP | 2005-84919 | 3/2005 |

OTHER PUBLICATIONS

Ng, R. T. et al., "Exploratory Mining and Pruning Optimizations of Constrained Associations Rules," Proc. Of The 1998 SIGMOD Conf., pp. 1-26, (1998).

Pei, et al., "Mining Sequential Patterns with Constraints in Large Databases," Proc. Of The 2002 ACM CIKM Conf., containing 8 sheets, (2002).

Han, H. et al., "Data Mining: Concepts and Techniques," Academic Press, San Diego, California, Chapter 6, pp. 236-269, (2001).

* cited by examiner

*Primary Examiner*—James C Kerveros
(74) *Attorney, Agent, or Firm*—Finnegan, Henderson, Farabow, Garrett & Dunner, L.L.P.

(57) ABSTRACT

Constraining sequential data expressing sequential data which a sequential pattern to be extracted must include is specified in advance. Sequential pattern candidates with sequence length 1 are initially determined from among a plurality of input sequential data. Next, a set of sequential pattern candidates is generated by determining a plurality of new sequential pattern candidates by elongating the sequence length of the sequential pattern candidates. In this sequential pattern candidate set, after sequential pattern candidates which can generate only a sequential pattern which does not include constraining sequential data are eliminated, sequential data which include constraining data, and frequently appear are extracted as a new sequential pattern.

15 Claims, 40 Drawing Sheets

1 ⟨(Inquiry, favorable comment), meeting appointment, (meeting, favorable comment), acceptance of order, development, (delivery, favorable comment)⟩
2 ⟨Acceptance of order, customer request, review, (customer request, favorable comment), development, (delivery, favorable comment)⟩
3 ⟨(Customer request, unfavorable comment), review, (meeting, favorable comment), acceptance of order, development, (delivery, favorable comment)⟩
4 ⟨(Briefing session, customer request, unfavorable comment), review, (meeting, favorable comment), acceptance of order, development, (delivery, favorable comment)⟩
5 ⟨Inquiry, (briefing session, customer request, unfavorable comment), (briefing session, customer request, unfavorable comment), acceptance of order, trouble, cancellation of contract⟩
6 ⟨Acceptance of order, (customer request, favorable comment), development, delivery, (operation, favorable comment)⟩
7 ⟨(Briefing session, favorable comment), acceptance of order, development, delivery, (operation, unfavorable comment)⟩

F I G. 1

⟨ (Inquiry, favorable comment), delivery ⟩
⟨ (Inquiry, unfavorable comment), delivery ⟩
⟨ (Customer request, favorable comment), delivery ⟩
⟨ (Customer request, unfavorable comment), delivery ⟩

1 ⟨(Inquiry, favorable comment), meeting appointment, (meeting, favorable comment), acceptance of order, development, (delivery, favorable comment)⟩

2 ⟨Acceptance of order, customer request, review, (customer request, favorable comment), development, (delivery, favorable comment)⟩

3 ⟨(Customer request, unfavorable comment), review, (meeting, favorable comment), acceptance of order, development, (delivery, favorable comment)⟩

4 ⟨(Briefing session, customer request, unfavorable comment), review, (meeting, favorable comment), acceptance of order, development, (delivery, favorable comment)⟩

5 ⟨Inquiry, (briefing session, customer request, unfavorable comment), (briefing session, customer request, unfavorable comment), acceptance of order, trouble, cancellation of contract⟩

6 ⟨Acceptance of order, (customer request, unfavorable comment), review, customer request, review, (customer request, favorable comment), development, delivery, (operation, favorable comment)⟩

7 ⟨(Briefing session, favorable comment), acceptance of order, (customer request, favorable comment), development, delivery, (operation, unfavorable comment)⟩

FIG. 5

⟨ (Inquiry, favorable comment), delivery ⟩
⟨ (Customer request, favorable comment), delivery ⟩
⟨ (Customer request, unfavorable comment), delivery ⟩

FIG. 6

⟨ Inquiry ⟩ 1
⟨ Meeting appointment ⟩ 1
⟨ (Inquiry, favorable comment) ⟩ 1
⟨ (Briefing session, customer request) ⟩ 1
⟨ (Briefing session, unfavorable comment) ⟩ 1
⟨ (Operation, favorable comment) ⟩ 1
⟨ (Briefing session, favorable comment) ⟩ 1
⟨ (Operation, unfavorable comment) ⟩ 1
⟨ (Briefing session, customer request, unfavorable comment) ⟩ 1
⟨ Briefing session ⟩ 2
⟨ Operation ⟩ 2
⟨ Meeting ⟩ 3
⟨ (Meeting, favorable comment) ⟩ 3
⟨ (Customer request, favorable comment) ⟩ 3
⟨ (Customer request, unfavorable comment) ⟩ 3
⟨ Unfavorable comment ⟩ 4
⟨ (Delivery, favorable comment) ⟩ 4
⟨ Review ⟩ 4
⟨ Customer request ⟩ 5
⟨ Acceptance of order ⟩ 6
⟨ Development ⟩ 6
⟨ Delivery ⟩ 6
⟨ Favorable comment ⟩ 6

FIG. 7

FIG. 8
```
⟨Meeting⟩ 3
⟨(Meeting, favorable comment)⟩ 3
⟨(Customer request, favorable comment)⟩ 3
⟨(Customer request, unfavorable comment)⟩ 3
⟨Unfavorable comment⟩ 4
⟨(Delivery, favorable comment)⟩ 4
⟨Review⟩ 4
⟨Customer request⟩ 5
⟨Acceptance of order⟩ 6
⟨Development⟩ 6
⟨Delivery⟩ 6
⟨Favorable comment⟩ 6
```

FIG. 9
```
⟨(Customer request, favorable comment), delivery⟩
⟨(Customer request, unfavorable comment), delivery⟩
```

FIG. 11
```
⟨Meeting⟩ 2
⟨(Meeting, favorable comment)⟩ 2
```

FIG. 12
```
⟨(Customer request, favorable comment)⟩ 3
⟨(Customer request, unfavorable comment)⟩ 3
⟨Unfavorable comment⟩ 4
⟨(Delivery, favorable comment)⟩ 4
⟨Review⟩ 4
⟨Customer request⟩ 5
⟨Acceptance of order⟩ 6
⟨Development⟩ 6
⟨Delivery⟩ 6
⟨Favorable comment⟩ 6
```

2 ⟨Acceptance of order, customer request, review, (customer request, favorable comment), development, (delivery, favorable comment)⟩

3 ⟨(Customer request, unfavorable comment), review, (meeting, favorable comment), acceptance of order, development, (delivery, favorable comment)⟩

4 ⟨(Briefing session, customer request, unfavorable comment), review, (meeting, favorable comment), acceptance of order, development, (delivery, favorable comment)⟩

6 ⟨Acceptance of order, (customer request, unfavorable comment), review, customer request, review, (customer request, favorable comment), development, delivery, (operation, favorable comment)⟩

7 ⟨(Briefing session, favorable comment), acceptance of order, (customer request, favorable comment), development, delivery, (operation, unfavorable comment)⟩

FIG. 10

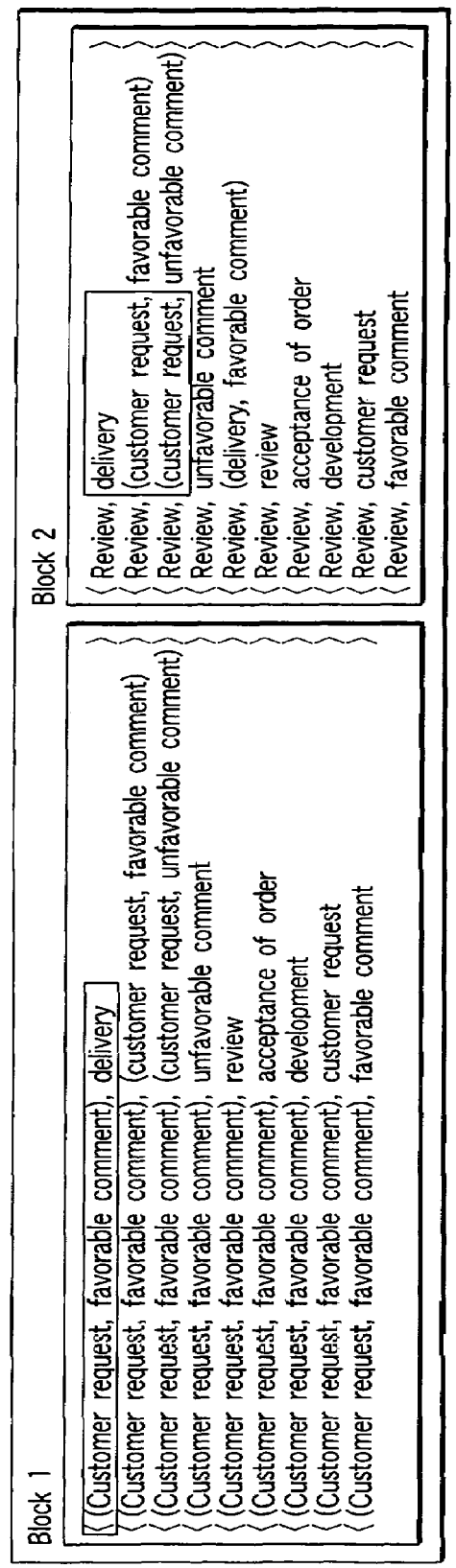
F I G. 14

⟨ (Customer request, favorable comment), delivery ⟩ 3
⟨ (Customer request, unfavorable comment), delivery ⟩ 3

FIG. 20

⟨ (Customer request, favorable comment), development, delivery ⟩ 3

⟨ (Customer request, unfavorable comment), review, delivery ⟩ 3

⟨ (Customer request, unfavorable comment), development, delivery ⟩ 3

⟨ (Customer request, unfavorable comment), favorable comment, delivery ⟩ 3

⟨ Acceptance of order, (customer request, favorable comment), delivery ⟩ 3

FIG. 25

⟨⟨Customer request, favorable comment⟩, (customer request, favorable comment)⟩ 0
⟨⟨Customer request, favorable comment⟩, (customer request, unfavorable comment)⟩ 0
⟨⟨Customer request, favorable comment⟩, unfavorable comment⟩ 1
⟨⟨Customer request, favorable comment⟩, (delivery, favorable comment)⟩ 1
⟨⟨Customer request, favorable comment⟩, review⟩ 0
⟨⟨Customer request, favorable comment⟩, acceptance of order⟩ 0
⟨⟨Customer request, favorable comment⟩, customer request⟩ 0
⟨⟨Customer request, favorable comment⟩, favorable comment⟩ 2

⟨⟨Customer request, unfavorable comment⟩, (customer request, favorable comment)⟩ 1
⟨⟨Customer request, unfavorable comment⟩, (customer request, unfavorable comment)⟩ 0
⟨⟨Customer request, unfavorable comment⟩, unfavorable comment⟩ 0
⟨⟨Customer request, unfavorable comment⟩, (delivery, favorable comment)⟩ 2
⟨⟨Customer request, unfavorable comment⟩, customer request⟩ 1

⟨Unfavorable comment, (customer request, favorable comment)⟩ 1
⟨Unfavorable comment, (customer request, unfavorable comment)⟩ 0

⟨(Delivery, favorable comment), delivery⟩ 0

⟨Review, (customer request, favorable comment)⟩ 2
⟨Review, (customer request, unfavorable comment)⟩ 0

⟨Acceptance of order, (customer request, unfavorable comment)⟩ 1
⟨Acceptance of order, unfavorable comment⟩ 2
⟨Acceptance of order, review⟩ 2
⟨Acceptance of order, acceptance of order⟩ 0

⟨Development, (customer request, favorable comment)⟩ 0
⟨Development, (customer request, unfavorable comment)⟩ 0

⟨Delivery, delivery⟩ 0

⟨Customer request, (customer request, favorable comment)⟩ 2
⟨Customer request, (customer request, unfavorable comment)⟩ 0

⟨Favorable comment, (customer request, favorable comment)⟩ 1
⟨Favorable comment, (customer request, unfavorable comment)⟩ 0

⟨⟨Customer request, favorable comment⟩, delivery, development⟩ 0
⟨⟨Customer request, favorable comment⟩, development, development⟩ 0

⟨⟨Customer request, unfavorable comment⟩, review, review⟩ 1

⟨⟨Customer request, unfavorable comment⟩, development, review⟩ 0
⟨⟨Customer request, unfavorable comment⟩, development, development⟩ 0

⟨⟨Customer request, unfavorable comment⟩, delivery, review⟩ 0
⟨⟨Customer request, unfavorable comment⟩, delivery, development⟩ 0
⟨⟨Customer request, unfavorable comment⟩, delivery, favorable comment⟩ 1

⟨⟨Customer request, unfavorable comment⟩, favorable comment, review⟩ 0

F I G. 23

⟨(Customer request, favorable comment), development, delivery⟩3

⟨(Customer request, unfavorable comment), review, delivery⟩3
⟨(Customer request, unfavorable comment), review, development⟩3
⟨(Customer request, unfavorable comment), review, favorable comment⟩3

⟨(Customer request, unfavorable comment), development, delivery⟩3
⟨(Customer request, unfavorable comment), development, favorable comment⟩3

⟨(Customer request, unfavorable comment), favorable comment, delivery⟩3
⟨(Customer request, unfavorable comment), favorable comment, development⟩3
⟨(Customer request, unfavorable comment), favorable comment, favorable comment⟩3

⟨Acceptance of order, (customer request, favorable comment), delivery⟩3
⟨Acceptance of order, (customer request, favorable comment), development⟩3

⟨⟨Customer request, favorable comment), (customer request, favorable comment)⟩ 0
⟨⟨Customer request, favorable comment), (customer request, unfavorable comment)⟩ 0
⟨⟨Customer request, favorable comment), unfavorable comment⟩ 1
⟨⟨Customer request, favorable comment), (delivery, favorable comment)⟩ 1
⟨⟨Customer request, favorable comment), review⟩ 1
⟨⟨Customer request, favorable comment), acceptance of order⟩ 0
⟨⟨Customer request, favorable comment), customer request⟩ 0
⟨⟨Customer request, favorable comment), favorable comment⟩ 2
⟨⟨Customer request, unfavorable comment), (customer request, favorable comment)⟩ 1
⟨⟨Customer request, unfavorable comment), (customer request, unfavorable comment)⟩ 0
⟨⟨Customer request, unfavorable comment), unfavorable comment⟩ 0
⟨⟨Customer request, unfavorable comment), (delivery, favorable comment)⟩ 2
⟨⟨Customer request, unfavorable comment), customer request⟩ 1
⟨⟨Unfavorable comment, (customer request, favorable comment)⟩ 1
⟨⟨Unfavorable comment, (customer request, unfavorable comment)⟩ 0
⟨(Delivery, favorable comment), delivery⟩ 0
⟨Review, (customer request, favorable comment)⟩ 2
⟨Review, (customer request, unfavorable comment)⟩ 0
⟨Acceptance of order, (customer request, unfavorable comment)⟩ 1
⟨Acceptance of order, unfavorable comment⟩ 2
⟨Acceptance of order, review⟩ 2
⟨Acceptance of order, acceptance of order⟩ 0
⟨⟨Development, (customer request, favorable comment)⟩ 0
⟨⟨Development, (customer request, unfavorable comment)⟩ 0
⟨Delivery, delivery⟩ 0
⟨⟨Customer request, (customer request, favorable comment)⟩ 2
⟨⟨Customer request, (customer request, unfavorable comment)⟩ 0
⟨⟨Favorable comment, (customer request, favorable comment)⟩ 1
⟨⟨Favorable comment, (customer request, unfavorable comment)⟩ 0

⟨(Customer request, favorable comment), delivery, development⟩ 0
⟨⟨Customer request, favorable comment), development, development⟩ 0
⟨(Customer request, unfavorable comment), review, review⟩ 1
⟨⟨Customer request, unfavorable comment), development, review⟩ 0
⟨⟨Customer request, unfavorable comment), development, development⟩ 0
⟨⟨Customer request, unfavorable comment), delivery, review⟩ 0
⟨⟨Customer request, unfavorable comment), delivery, development⟩ 0
⟨⟨Customer request, unfavorable comment), delivery, favorable comment⟩ 1
⟨(Customer request, unfavorable comment), favorable comment, review⟩ 0
⟨⟨Acceptance of order, development, (customer request, favorable comment)⟩ 0
⟨⟨Acceptance of order, customer request, (customer request, favorable comment)⟩ 2
⟨⟨Acceptance of order, favorable comment, (customer request, favorable comment)⟩ 0
⟨⟨Customer request, unfavorable comment), development, favorable comment, delivery⟩ 0
⟨⟨Customer request, unfavorable comment), favorable comment, favorable comment, delivery⟩ 0

FIG. 28

⟨⟨Acceptance of order, ⟨customer request, favorable comment⟩, development, delivery⟩ 3

⟨⟨Customer request, unfavorable comment⟩, review, development, delivery⟩ 3
⟨⟨Customer request, unfavorable comment⟩, review, development, favorable comment⟩ 3
⟨⟨Customer request, unfavorable comment⟩, review, favorable comment, delivery⟩ 3
⟨⟨Customer request, unfavorable comment⟩, review, favorable comment, development⟩ 3
⟨⟨Customer request, unfavorable comment⟩, review, favorable comment, favorable comment⟩ 3
⟨⟨Customer request, unfavorable comment⟩, favorable comment, development, delivery⟩ 3
⟨⟨Customer request, unfavorable comment⟩, favorable comment, development, favorable comment⟩ 3

F I G. 29

⟨(Customer request, unfavorable comment), review, development, delivery⟩ 3
⟨(Customer request, unfavorable comment), review, development, favorable comment⟩ 3
⟨(Customer request, unfavorable comment), review, favorable comment, delivery⟩ 3
⟨(Customer request, unfavorable comment), favorable comment, development, delivery⟩ 3

⟨Acceptance of order, (customer request, favorable comment), development, delivery⟩ 3

F I G. 30

⟨⟨Acceptance of order ⟨customer request, favorable comment,
development, delivery, delivery⟩⟩

⟨⟨Customer request, unfavorable comment⟩,
review, development, delivery, delivery⟩
⟨⟨Customer request, unfavorable comment⟩,
review, development, delivery, favorable comment⟩
⟨⟨Customer request, unfavorable comment⟩,
review, development, favorable comment, delivery⟩
⟨⟨Customer request, unfavorable comment⟩,
review, development, favorable comment, favorable comment⟩
⟨⟨Customer request, unfavorable comment⟩,
review, favorable comment, delivery, delivery⟩
⟨⟨Customer request, unfavorable comment⟩,
review, favorable comment, delivery, development⟩
⟨⟨Customer request, unfavorable comment⟩,
review, favorable comment, delivery, favorable comment⟩
⟨⟨Customer request, unfavorable comment⟩,
review, favorable comment, development, delivery⟩
⟨⟨Customer request, unfavorable comment⟩,
review, favorable comment, development, development⟩
⟨⟨Customer request, unfavorable comment⟩,
review, favorable comment, development, favorable comment⟩
⟨⟨Customer request, unfavorable comment⟩,
review, favorable comment, favorable comment, delivery⟩
⟨⟨Customer request, unfavorable comment⟩,
review, favorable comment, favorable comment, development⟩
⟨⟨Customer request, unfavorable comment⟩,
review, favorable comment, favorable comment, favorable comment⟩
⟨⟨Customer request, unfavorable comment⟩,
favorable comment, development, delivery, delivery⟩
⟨⟨Customer request, unfavorable comment⟩,
favorable comment, development, delivery, favorable comment⟩
⟨⟨Customer request, unfavorable comment⟩,
favorable comment, development, favorable comment, delivery⟩
⟨⟨Customer request, unfavorable comment⟩,
favorable comment, development, favorable comment, favorable comment⟩

⟨Acceptance of order (customer request, favorable comment), development, delivery, delivery⟩ △

⟨(Customer request, unfavorable comment), review, development, delivery, delivery⟩ △
⟨(Customer request, unfavorable comment), review, development, delivery, favorable comment⟩ X ⟨(Customer request, unfavorable comment), review, development, favorable comment, delivery⟩ △
⟨(Customer request, unfavorable comment), review, development, favorable comment, favorable comment⟩ X ⟨(Customer request, unfavorable comment), review, favorable comment, delivery, delivery⟩ △
⟨(Customer request, unfavorable comment), review, favorable comment, delivery, development⟩ △
⟨(Customer request, unfavorable comment), review, favorable comment, delivery, favorable comment⟩ △

⟨(Customer request, unfavorable comment), review, favorable comment, development, delivery⟩ 3
⟨(Customer request, unfavorable comment), review, favorable comment, development, development⟩ △
⟨(Customer request, unfavorable comment), review, favorable comment, development, favorable comment⟩ 3

⟨(Customer request, unfavorable comment), review, favorable comment, favorable comment, delivery⟩ △
⟨(Customer request, unfavorable comment), review, favorable comment, favorable comment, development⟩ X
⟨(Customer request, unfavorable comment), review, favorable comment, favorable comment, favorable comment⟩ X ⟨(Customer request, unfavorable comment), favorable comment, development, delivery, delivery⟩ △
⟨(Customer request, unfavorable comment), favorable comment, development, delivery, favorable comment⟩ △

⟨(Customer request, unfavorable comment), favorable comment, development, favorable comment, delivery⟩ △
⟨(Customer request, unfavorable comment), favorable comment, development, favorable comment, favorable comment⟩ X Numbers  Frequency of appearance
Not to satisfy sequential pattern candidate conditions     X
There are infrequently appearing sequential data in a subset   △
To be judged to be infrequently appearing by frequency counting  □

⟨(Customer request, unfavorable comment), review, favorable comment, development, delivery⟩ 3
⟨(Customer request, unfavorable comment), review, favorable comment, development, delivery⟩ 3

3 ⟨(Customer request, unfavorable comment), review, (meeting, favorable comment), acceptance of order, development, (delivery, favorable comment)⟩
4 ⟨(Briefing session, customer request, unfavorable comment), review, (meeting, favorable comment), acceptance of order, development, (delivery, favorable comment)⟩
6 ⟨Acceptance of order, (customer request, unfavorable comment), review, customer request, review, (customer request, favorable comment), development, delivery, (operation, favorable comment)⟩

Sequential data including constraint set

⟨(Customer request, favorable comment), delivery⟩

Constraining sequential data set

* Since there is no sequential pattern candidate including ⟨(customer request, favorable comment), delivery⟩, elimination of unnecessary sequential data at step 5 has been carried out

⟨(Customer request, unfavorable comment), review, favorable comment, development, delivery⟩ 3

---

⟨(Customer request, unfavorable comment), review,
   favorable comment, development, delivery, delivery⟩        △
⟨(Customer request, unfavorable comment), review,
   favorable comment, development, delivery, favorable comment⟩ △

⟨(Customer request, unfavorable comment), review,
   favorable comment, development, delivery, delivery⟩        △
⟨(Customer request, unfavorable comment), review,
   favorable comment, development, delivery, favorable comment⟩ X Numbers  Frequency of appearance
Not to satisfy sequential pattern candidate conditions           X
There are infrequently appearing sequential data in a subset     △
To be judged to be infrequently appearing by frequency counting  ☐

⟨(Customer request, favorable comment), delivery⟩ 3
⟨(Customer request, unfavorable comment), delivery⟩ 3

⟨(Customer request, favorable comment), development, delivery⟩ 3

⟨(Customer request, unfavorable comment), review, delivery⟩ 3
⟨(Customer request, unfavorable comment), development, delivery⟩ 3
⟨(Customer request, unfavorable comment), favorable comment, delivery⟩ 3

⟨Acceptance of order, (customer request, favorable comment), delivery⟩ 3

⟨(Customer request, unfavorable comment), review, development, delivery⟩ 3
⟨(Customer request, unfavorable comment), review,
   favorable comment, delivery⟩ 3
⟨(Customer request, unfavorable comment), favorable comment,
   development, delivery⟩ 3

⟨Acceptance of order, (customer request, favorable comment),
   development, delivery⟩ 3

⟨(Customer request, unfavorable comment), review, favorable comment,
   development, delivery⟩ 3

FIG. 36

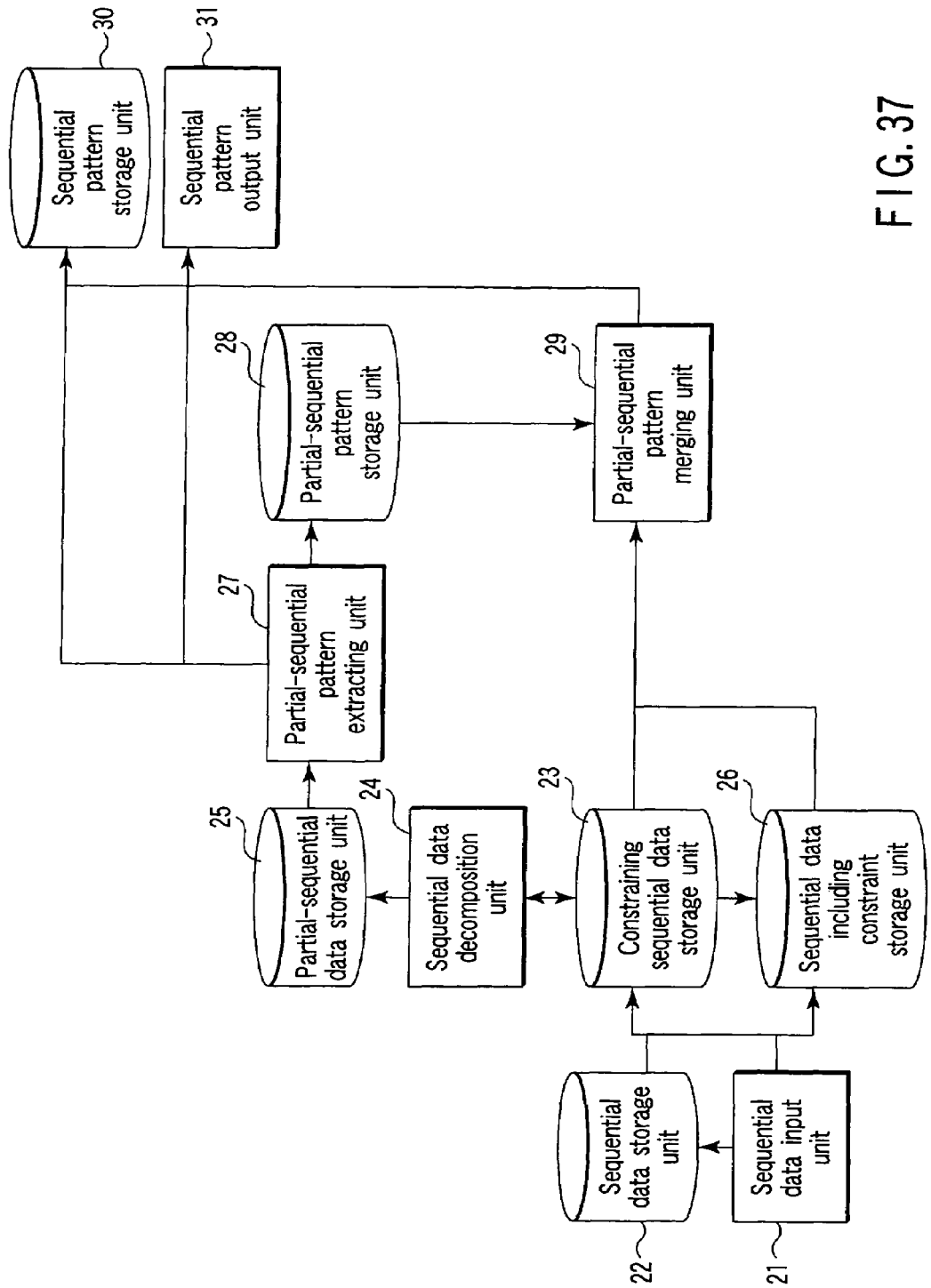
F I G. 37

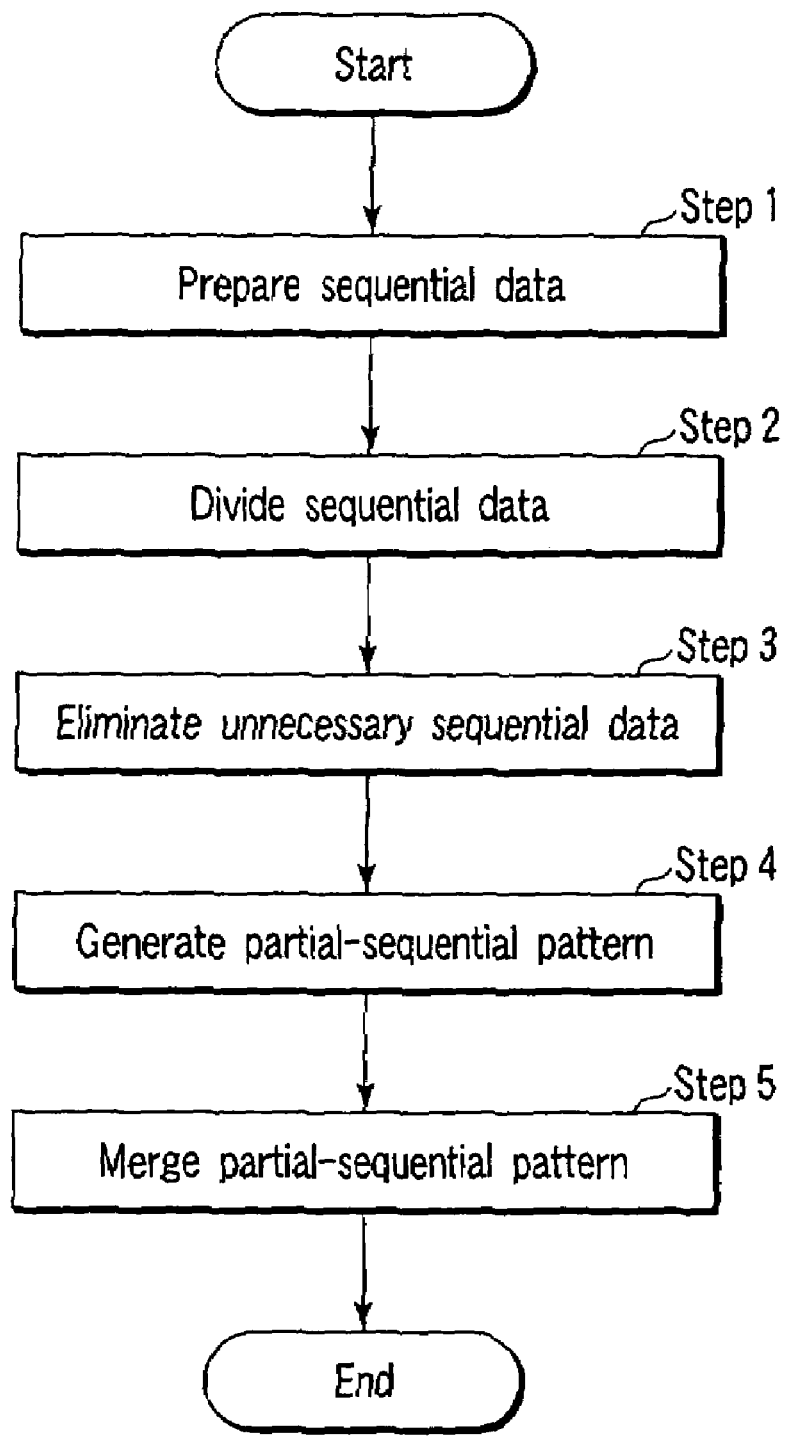
F I G. 38

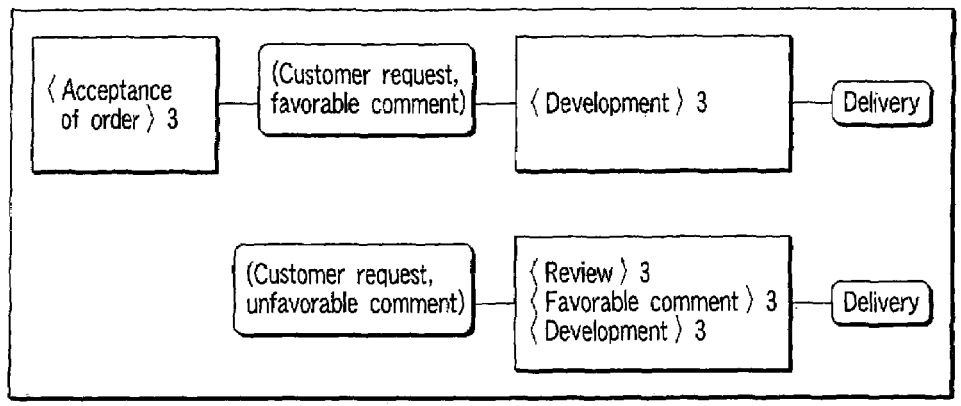
F I G. 42
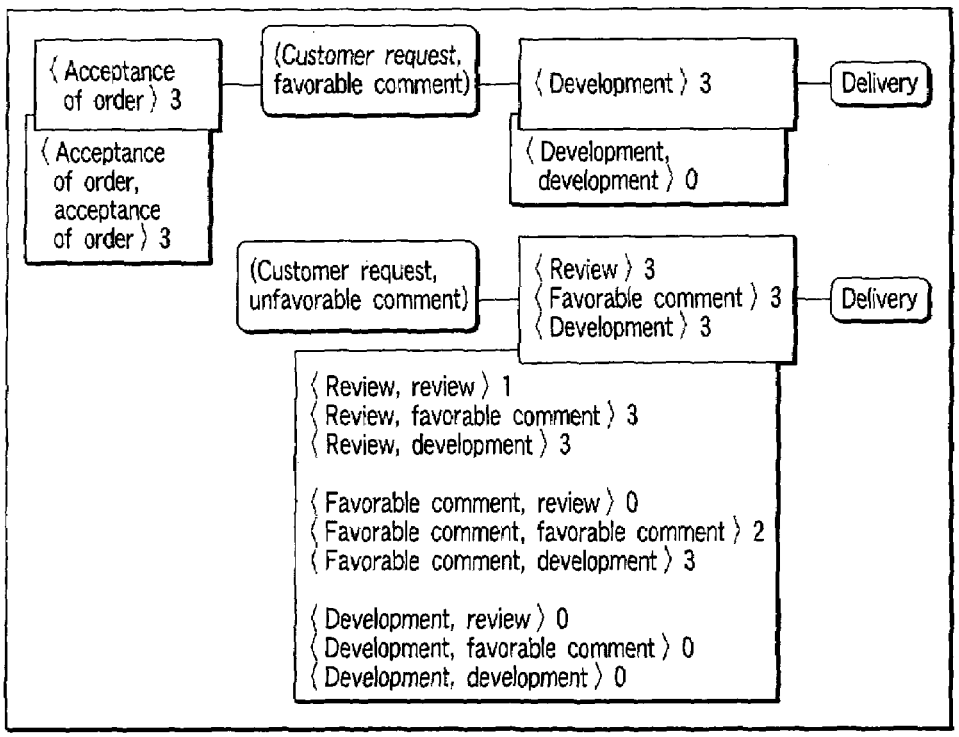
F I G. 43

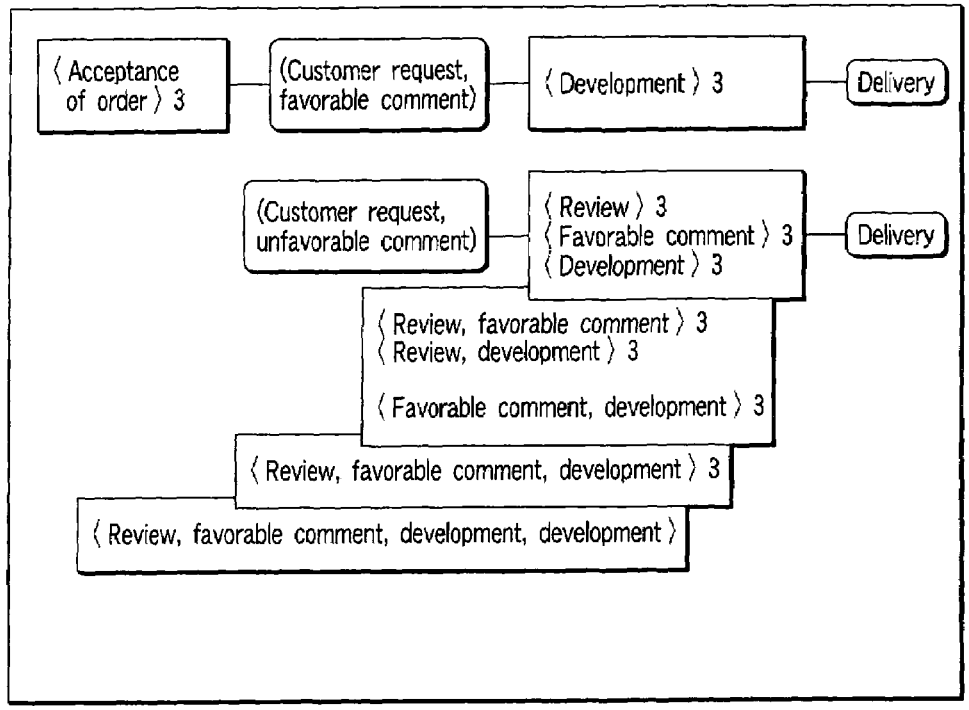
F I G. 48
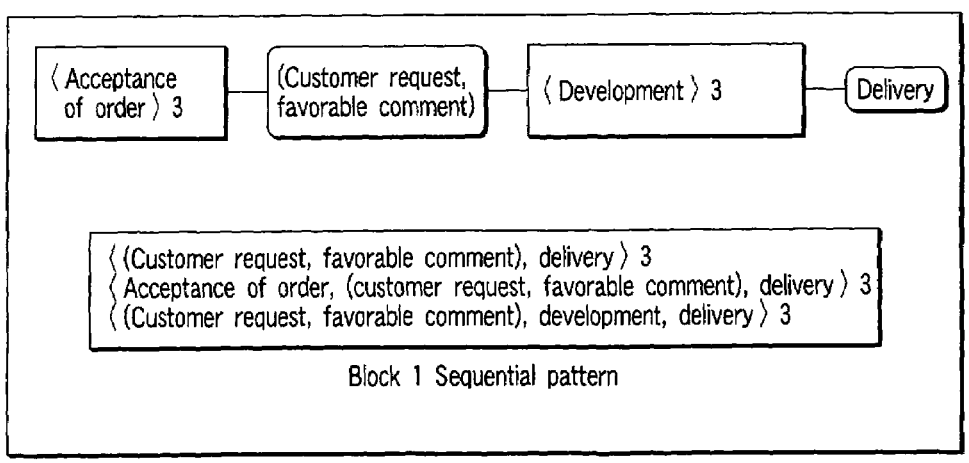
F I G. 49

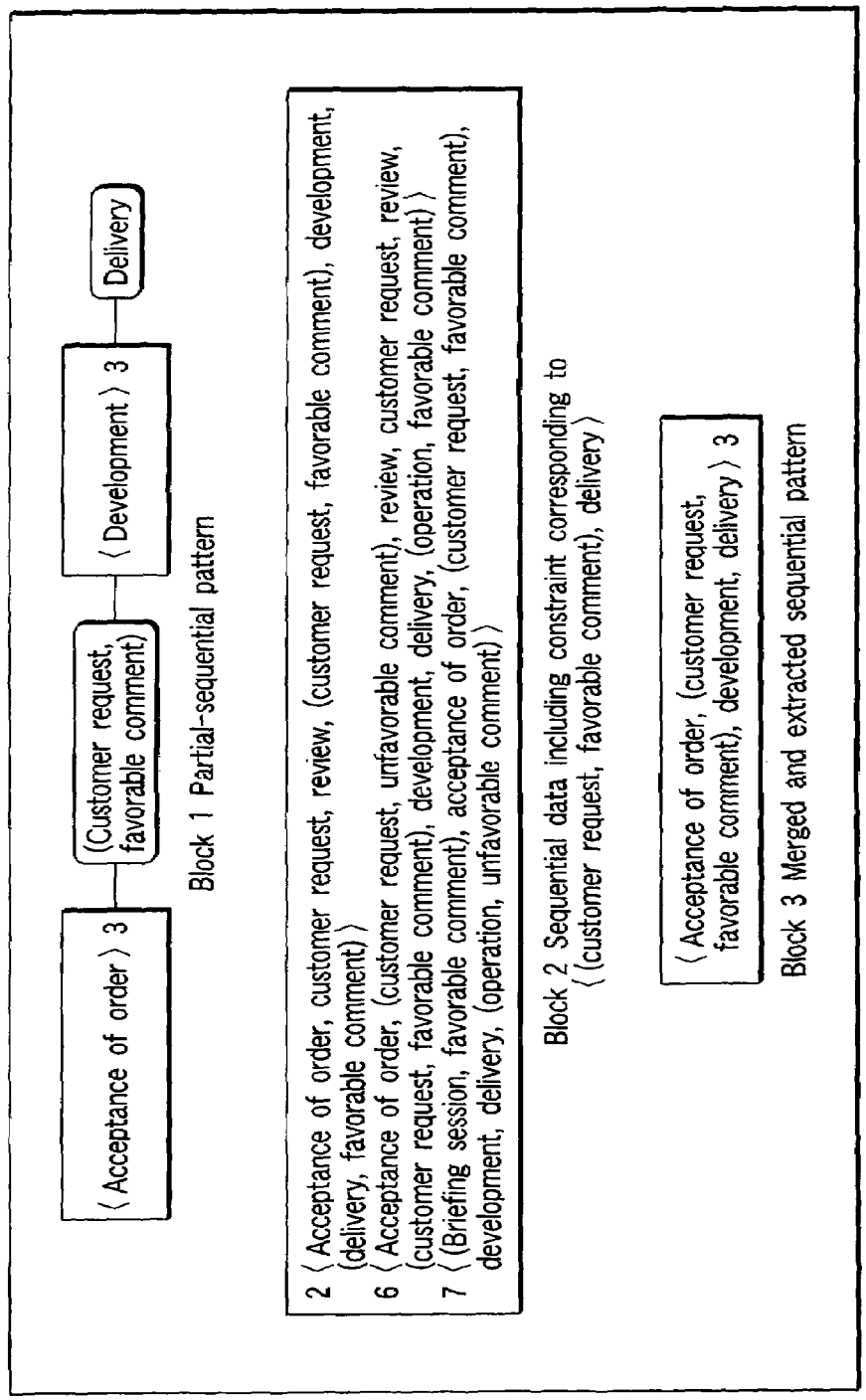
F I G. 51

⟨⟨Customer request, favorable comment⟩, delivery⟩ 3
⟨⟨Customer request, unfavorable comment⟩, delivery⟩ 3
⟨Acceptance of order, ⟨customer request, favorable comment⟩, delivery⟩ 3
⟨⟨Customer request, favorable comment⟩, development, delivery⟩ 3
⟨⟨Customer request, unfavorable comment⟩, review, delivery⟩ 3
⟨⟨Customer request, unfavorable comment⟩, favorable comment, delivery⟩ 3
⟨⟨Customer request, unfavorable comment⟩, development, delivery⟩ 3
⟨⟨Customer request, unfavorable comment⟩, review, favorable comment, delivery⟩ 3
⟨⟨Customer request, unfavorable comment⟩, review, development, delivery⟩ 3
⟨⟨Customer request, unfavorable comment⟩, favorable comment, development, delivery⟩ 3
⟨⟨Customer request, unfavorable comment⟩, review, favorable comment, development, delivery⟩ 3
⟨Acceptance of order, ⟨customer request, favorable comment⟩, development, delivery⟩ 3

F I G. 52

SEQUENTIAL PATTERN EXTRACTING APPARATUS

CROSS-REFERENCE TO RELATED APPLICATIONS

This application is based upon and claims the benefit of priority from prior Japanese Patent Application No. 2005-222808, filed Aug. 1, 2005, the entire contents of which are incorporated herein by reference.

BACKGROUND OF THE INVENTION

1. Field of the Invention

The present invention relates to a sequential pattern extracting apparatus, a sequential pattern extracting method, and a sequential pattern extracting program in which frequently-appearing sequential data are extracted as a sequential pattern from a data set including sequential data.

2. Description of the Related Art

In a pattern extracting apparatus, when a minimum support specified in advance is made high, only a self-evident pattern is extracted. On the other hand, when the minimum support is made low, extraction processing time is made longer, and a highly frequently-appearing pattern is extracted regardless of the existence or nonexistence of a request from an analyst (user). Thus, a large quantity of extraction results are output in many cases, which makes analysis complicated. This characteristic is made more remarkable as a data volume to be handled increases.

As a measure to solve this problem, there is disclosed in Jpn. Pat. Appln. KOKAI No. 9-251467 that a processing time is shortened by carrying out pattern extraction by using only appropriate data items in consideration of the duplication and the worth of data items.

Further, there is disclosed in the following Jpn. Pat. Appln. KOKAI No. 2004-110327 that a processing time is shortened by carrying out refinement of processing object data and suppression of extracted results based on a constraint specified in advance, and only an extracted pattern necessary for an analyst is output.

In the method disclosed in the above-described Jpn. Pat. Appln. KOKAI No. 9-251467, since a useful pattern is extracted in some cases by using items determined to be improper, there is a problem that omission in an extracted result is brought about. Further, in the method disclosed in the above-described Jpn. Pat. Appln. KOKAI No. 2004-110327, the constraint specified in advance does not contribute to the efficiency of the pattern extraction processing itself, and there is a problem that a tremendous extraction processing time is required when processing object data as a result of refinement based on the constraint is enormous.

Accordingly, in a conventional sequential pattern extracting apparatus, even a useful sequential pattern is not extracted in some cases. Or, there is a problem that extraction processing time is long.

BRIEF SUMMARY OF THE INVENTION

One aspect of the present invention is directed to a sequential pattern extracting apparatus which extracts a sequential pattern frequently appearing in sequential data each including items. The apparatus includes a first storage device to store constraining sequential data expressing sequential data which a sequential pattern to be extracted must include. The apparatus also includes a generating device which generates a sequential pattern candidate set from the plurality of sequential data. The sequential pattern candidate set includes a plurality of sequential pattern candidates each including sequential data. In the apparatus, a second storage device stores the generated sequential pattern candidate set. A first elimination device is configured to eliminate sequential pattern candidates which do not satisfy sequential pattern candidate conditions from the sequential pattern candidate set stored in the second storage device. The sequential pattern candidate conditions specify inclusion relations of the items between the sequential data included in the sequential pattern candidates and the constraining sequential data. And, the apparatus further includes an extracting device configured to extract the sequential pattern including the constraining sequential data from the sequential pattern candidate set remaining in the second storage device.

BRIEF DESCRIPTION OF THE SEVERAL VIEWS OF THE DRAWING

FIG. 1 is a diagram showing a sequential data set (sales report data) serving as an analysis object;

FIG. 5 is a diagram showing a sequential data including constraint set;

FIG. 6 is a diagram showing a constraining sequential data set;

FIG. 7 is a diagram showing single-sequential data;

FIG. 8 is a diagram showing a single-sequential pattern candidate set;

FIG. 9 is a diagram showing a constraining sequential data set;

FIG. 10 is a diagram showing a sequential data including constraint set;

FIG. 11 is a diagram showing single-sequential pattern candidates serving as recounting objects;

FIG. 12 is a diagram showing a single-sequential pattern candidate set after recounting;

FIG. 14 is a diagram for explanation of pruning based on a constraint;

FIG. 20 is a diagram showing a double-sequential pattern;

FIG. 23 is a diagram showing an infrequently-appearing sequential data set;

FIG. 24 is a diagram showing a set of sequential pattern candidates with sequence length 3.

FIG. 25 is a diagram showing a sequential pattern with sequence length 3;

Figure 26:
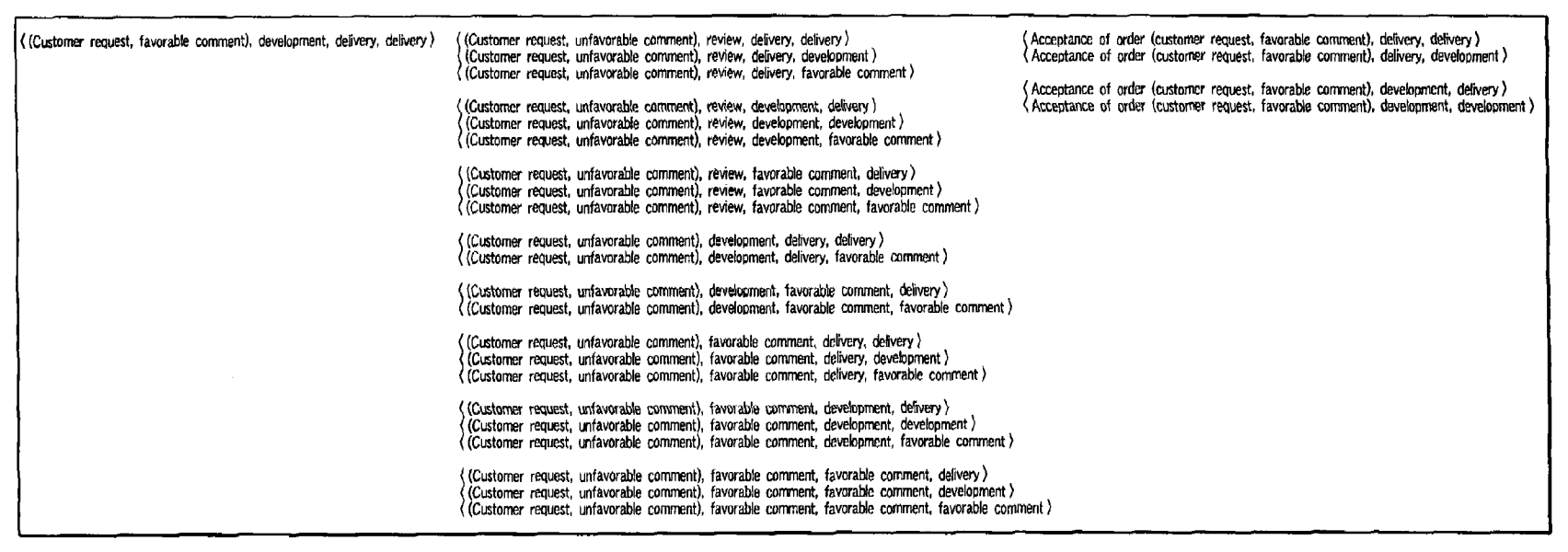

FIG. 26 is a diagram showing self-join of sequential pattern candidates with sequence length 3;

FIG. 28 is a diagram showing infrequently-appearing sequential data up to sequence length 4;

FIG. 29 is a diagram showing a set of sequential pattern candidates with sequence length 4;

FIG. 30 is a diagram showing a sequential pattern with sequence length 4;

FIG. 31 is a diagram showing self-join of sequential pattern candidates with sequence length 4;

FIG. 32 is a diagram showing generation of sequential pattern candidates with sequence length 5;

FIG. 33 is a diagram showing sequential pattern candidates with sequence length 5;

FIG. 34 is a diagram showing a sequential pattern with sequence length 5;

FIG. 35 is a diagram showing generation of sequential pattern candidates with sequence length 6;

FIG. 36 is a diagram showing a sequential pattern;

FIG. 37 is a block diagram showing a sequential pattern extracting apparatus according to a second embodiment of the present invention;

FIG. 38 is a flowchart showing the procedure of processing for extracting a sequential pattern according to the second embodiment of the present invention;

FIG. 42 is a diagram showing partial-sequential pattern extraction (single-sequential pattern candidates);

FIG. 43 is a diagram showing partial-sequential pattern extraction (frequency counting of double-sequential pattern candidates);

FIG. 48 is a diagram showing partial-sequential pattern extraction (self-join of quaternary-sequential pattern candidates);

FIG. 49 is a diagram showing a sequential pattern;

FIG. 51 is a diagram showing partial-sequential pattern merger; and

FIG. 52 is a diagram showing a sequential pattern finally obtained.

DETAILED DESCRIPTION OF THE INVENTION

Figures 2, 3:
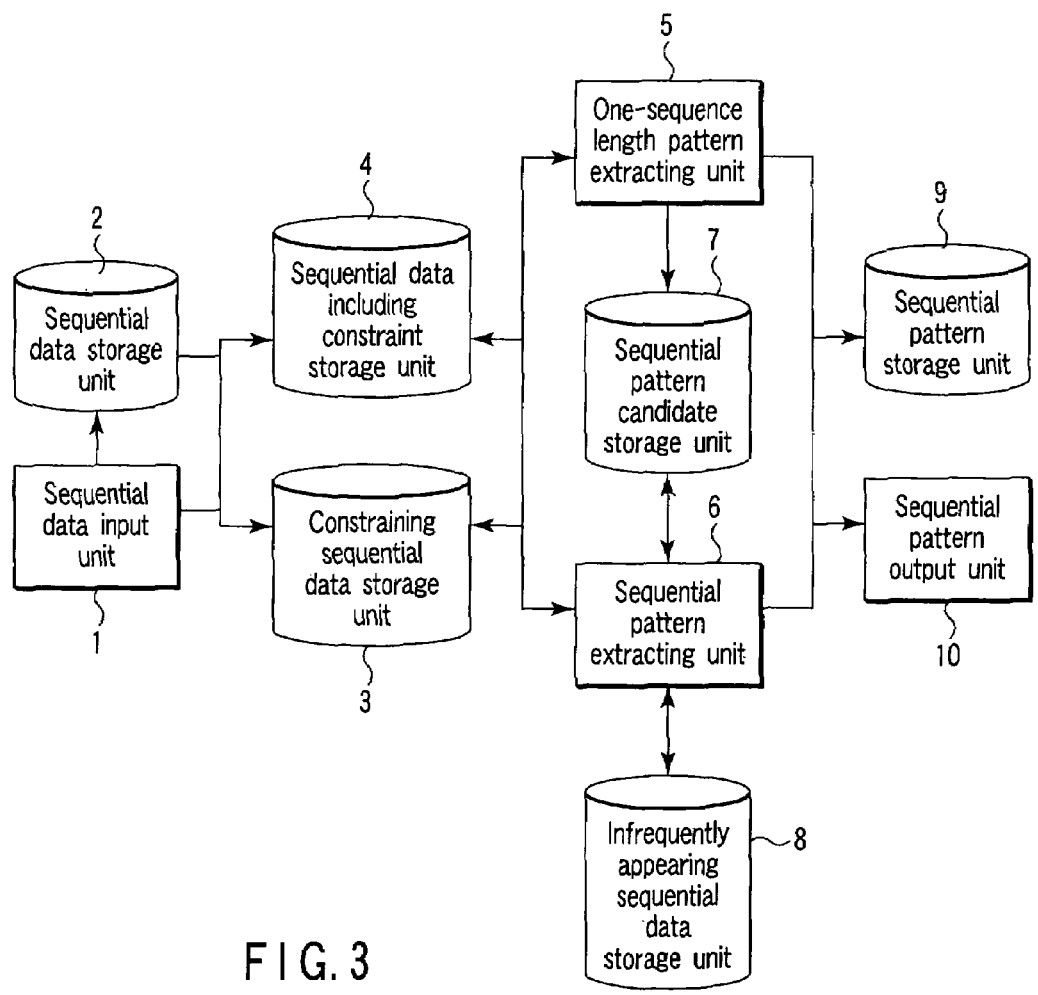
FIG. 2 is a diagram showing a constraining sequential data set.
FIG. 3 is a block diagram showing a sequential pattern extracting apparatus according to a first embodiment of the present invention.

A first embodiment of the present invention is, as compared with a conventional sequential pattern extracting apparatus using apriority, to make an attempt to reduce throughput such that a constraint that only frequently-appearing sequential data including specified sequential data must be extracted as a sequential pattern, and sequential data determined to be unable to generate a sequential pattern satisfying the constraint are eliminated from a sequential pattern candidate set during sequential pattern extraction processing. "Apriority" is a characteristic wherein there is no case in which the frequency of any subset in sequential data is made higher than the frequency of the sequential data.

Further, the following characteristic is used for determining whether or not the constraint is satisfied. Namely, it is the characteristic that, in sequential data serving as sequential pattern candidates, when one element of the sequential data, which is not included in a line of elements except for a element added at the time of increasing the number of elements of the sequential data, and which is stored as a constraint, is not included in the element added at the time of increasing the number of elements of sequential data serving as sequential pattern candidates of one of sequential data included in a set of classified sequential data, frequently-appearing sequential data satisfying the constraint is not generated from the sequential data.

A second embodiment of the present invention is to place a constraint that only frequently-appearing sequential data including specified sequential data must be extracted as a sequential pattern. In particular, in the second embodiment, sequential data serving as an analysis object is divided with positions of elements included in constraining sequential data being as boundaries, and a sequential pattern is extracted for every set of divided sequential data, and a new sequential pattern is extracted by merging those sequential patterns. In accordance with the second embodiment as well, an attempt can be made to reduce throughput in the same way as in the first embodiment.

Hereinafter, in advance of detailed descriptions of the embodiments of the present invention, terms, notations, and the like will be described.

[Sequential Data]

In this specification, "sequential data" are data having single or plural information called "items" which have a concept of order, and are uniquely identifiable. Each sequential data is characterized by items. Further, in each sequential data, all items are uniquely put in order.

Provided that all the items are uniquely put in order, the standard of ordering may be a time, an order of priority, or a number. Further, it is possible for a plurality of items to be at the same position of order in ordering. For example, there may be a plurality of items at the same time in the case of time, and at the same order in the case of an order of priority, and with the same number in the case of a number.

Examples of sequential data are cited. A purchase record, a lending record, medical checkup interview data, and the like can be examples of sequential data. Further, waveform data such as pulse, brain wave, and traffic amount transition data of a network, or the like can be examples of sequential data by using a digitizing method as disclosed in Jpn. Pat. Appln. KOKAI No. 2004-287798. Further, text data such as a diary, a daily report, a Web site, a Web message board, a blog, or the like can be examples of sequential data by using a text mining method as disclosed in Jpn. Pat. Appln. KOKAI No. 2005-84919. Hereinafter, sales report data will be described as an example. FIG. 1 shows a set of sequential data prepared by using concept keywords which are extracted by a text mining method from a sales report data. Note that an identifier is added to the left of each sequential data.

Next, a notation system of sequential data will be described.

In the following descriptions, as notations of sequential data, notations such as "<Inquiry, meeting appointment, (meeting, favorable comment)>" are used. Elements enclosed with "<" and ">" show one sequential data, and "," shows a separator between elements, and elements enclosed with "(" and ")" show that those are generated at the same order position. Further, it is shown that more left elements have been generated earlier. In this case, it is shown that "meeting appointment" is generated after "Inquiry" is generated, and "meeting" and "favorable comment" are generated at the same order position after "meeting appointment" is generated. Further, sequential data whose orders are permuted are separate sequential data. For example, <meeting appointment, meeting> and <meeting, meeting appointment> are separate sequential data.

However, since elements enclosed with "(" and ")" are generated at the same order position, even if the orders are permuted, those are the same sequential data. For example, <(meeting, favorable comment)> and <(favorable comment, meeting)> are the same sequential data. Further, in the case where certain sequential data is included in another sequential data, the sequential data is included while maintaining the order as it is. For example, <meeting appointment, favorable comment> is included in <meeting appointment, (meeting, favorable comment)>. However, <meeting, favorable comment> is included in neither of <(meeting, favorable comment)> nor <favorable comment, meeting>. Further, the number of items when items included in sequential data are counted up in the way in which a plurality of items having the same order position is counted as one is called "sequence length" of the sequential data. For example, <Inquiry, meeting appointment, (meeting, favorable comment)> has sequence length 3.

[Sequential Pattern and Sequential Data Constraint]

In this specification, "sequential pattern" stands for sequential data having a support greater than a threshold value specified in advance. "Support" shows the number of analysis object sequential data including target sequential data which has a proportion in the number of sequential data which are analysis objects. For example, when target sequential data is <development>, and analysis object sequential data are three of <acceptance of order, development>, <development, acceptance of order, development>, and <acceptance of order>, since there are two analysis object sequential data including <development>, the support is 2/3. Further, the threshold value specified here in advance is called "minimum support". Further, it is a standard for determining to be "frequently-appearing" to have a support over the minimum support.

The constraint that, when one or plural sequential data are specified as constraining sequential data, a sequential pattern to be extracted must include one of the constraining sequential data is called "sequential data constraint". For example, when <Inquiry, acceptance of order> is specified as constraining sequential data, and when <Inquiry, acceptance of order, delivery> and <Inquiry, delivery> are found as frequently-appearing sequential data, the former satisfies the sequential data constraint, and the latter does not satisfy the sequential data constraint. Thus, only the former is extracted as a sequential pattern. Further, the sequential data constraint can be used so as to be combined with constraints as described in the following reference documents.

(Reference Document 1) Jiawiei Han, Micheline Kamber, "Data Mining Concepts and Techniques", Morgan Kaufman Publishers, 2001, the entire contents of which are incorporated herein by reference.

(Reference Document 2) Raymond T. Ng, Laks V. S. Lakshmanan, Jiawei Han, Alex Pang, "Exploratory Mining and Pruning Optimizations of Constrained Associations Rules", the entire contents of which are incorporated herein by reference.

(Reference Document 3) Jian Pei, Jiawiei Han, Wei Wang, "Mining Sequential Patterns with Constraints in Large Databases", the entire contents of which are incorporated herein by reference.

First Embodiment

FIG. 3 is a schematic block diagram of a sequential pattern extracting apparatus according to the first embodiment of the present invention. Hereinafter, the outline of processing and relationships among respective components will be described on the basis of FIG. 3.

A sequential data input unit 1 inputs information from the outside as sequential data serving as analysis objects from which a sequential pattern is extracted. Provided that the above-described function is provided, an input device can carry out optimum selection in accordance with use, and may be a keyboard, a mouse, a pen-type input device, or a sensor.

A sequential data storage unit 2 stores sequential data from which a sequential pattern is extracted. There is a case in which sequential data is stored in advance, or there is a case in which sequential data input from the sequential data input unit 1 is stored. Provided that the above-described function is provided, a storage device and a storage medium can carry out optimum selection in accordance with use, and database may be used, or text data may be used, or data in a format specified for each application may be used.

A constraining sequential data storage unit 3 stores sequential data which must be included in a sequential pattern to be extracted, as constraining sequential data, among sequential data stored in the sequential data storage unit 2, sequential data input from the sequential data input unit 1, and both of the sequential data. Moreover, sequential data which are unnecessary for processing of generating a sequential pattern with sequence length 2 or more which is specified by a one-sequence length pattern extracting unit 5 or a sequential pattern extracting unit 6 are eliminated. Provided that the above-described function is provided, in the same way as the sequential data storage unit 2, a storage device and a storage medium can carry out optimum selection in accordance with use.

A sequential data including constraint storage unit 4 stores only sequential data necessary for extracting a sequential pattern as sequential data including constraint, among sequential data stored in the sequential data storage unit 2, sequential data input from the sequential data input unit 1, and both of the sequential data.

Sequential data which are unnecessary for processing of generating a sequential pattern with sequence length 2 or more which are specified by the one-sequence length pattern extracting unit 5 or the sequential pattern extracting unit 6 are eliminated. Provided that the above-described function is provided, in the same way as the sequential data storage unit 2, a storage medium can carry out optimum selection in accordance with use.

The one-sequence length pattern extracting unit 5 takes out sequential data from the sequential data including constraint storage unit 4, generates sequential pattern candidates with sequence length 1, and extracts a sequential pattern.

The sequential pattern extracting unit 6 takes out sequential data from the constraining sequential data storage unit 3, the sequential data including constraint storage unit 4, a sequential pattern candidate storage unit 7, and an infrequently-appearing sequential data storage unit 8, and extracts a sequential pattern.

The sequential pattern candidate storage unit 7 stores sequential pattern candidates generated by the one-sequence length pattern extracting unit 5 or the sequential pattern extracting unit 6. Moreover, the sequential pattern candidate storage unit 7 eliminates sequential data specified by the one-sequence length pattern extracting unit 5 or the sequential pattern extracting unit 6. Provided that the above-described function is provided, in the same way as the sequential data storage unit 2, a storage device and a storage medium can carry out optimum selection in accordance with use.

The infrequently-appearing sequential data storage unit 8 stores infrequently-appearing sequential data generated by the sequential pattern extracting unit 6. Provided that the above-described function is provided, in the same way as the sequential data storage unit 2, a storage device and a storage medium can carry out optimum selection in accordance with use.

A sequential pattern storage unit 9 stores a sequential pattern extracted by the one-sequence length pattern extracting unit 5 or the sequential pattern extracting unit 6. Provided that the above-described function is provided, in the same way as the sequential data storage unit 2, a storage device and a storage medium can carry out optimum selection in accordance with use.

A sequential pattern output unit 10 outputs a sequential pattern extracted by the one-sequence length pattern extracting unit 5 or the sequential pattern extracting unit 6. Provided that the above-described function is provided, an output device can carry out optimum selection in accordance with use, and may be a display, a printer, or a mobile terminal device. Further, provided that the above-described function is provided, an output method can carry out optimum selection in accordance with use, and batch output, serial output, or sort output according to a support or confidence can be assumed.

The present invention can be executed as a program which makes a computer function as a sequential pattern extracting apparatus having the components as described above. In this case, the program according to embodiments of the present invention is stored in a program storage device in the computer. The program storage device is structured from, for example, a nonvolatile semiconductor storage device, a magnetic disk storage unit, and the like. Due to the above-described program being read into a random access memory (RAM) under the control from a CPU (not shown), and being executed by the CPU, a computer can be made to function as a sequential pattern extracting apparatus according to embodiments of the present invention. Note that an operating system which manages various computer resources, and provides a graphical user interface (GUI) or the like as well is installed in the computer.

Figure 4:
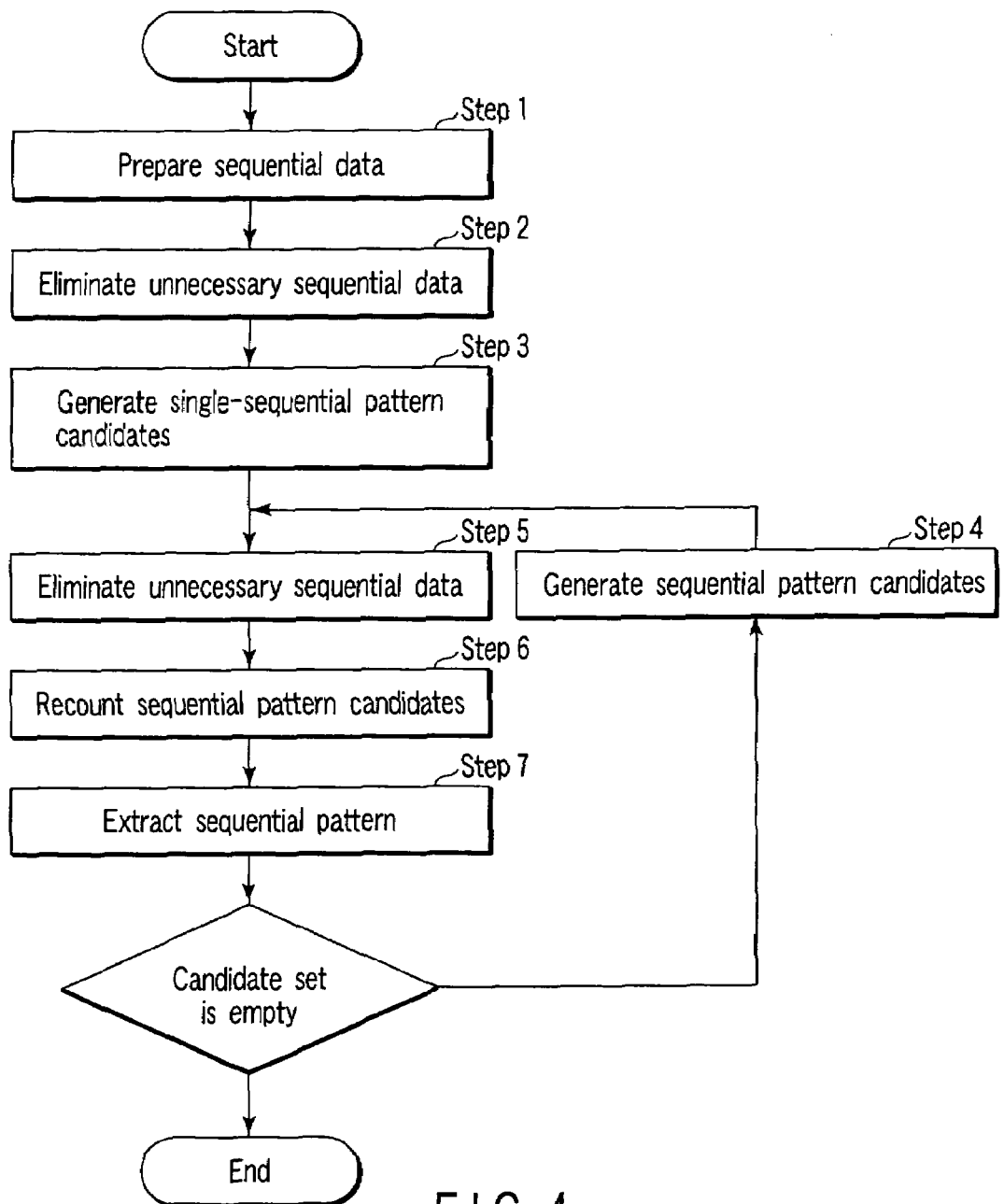
FIG. 4 is a flowchart showing the procedure of processing for extracting a sequential pattern according to the first embodiment of the present invention.

FIG. 4 is a flowchart showing the procedure of processing for extracting a sequential pattern according to the first embodiment of the present invention. Hereinafter, the procedure of processing for extracting a sequential pattern will be described with reference to FIG. 4.

First, at step 1 (Prepare sequential data), sequential data serving as analysis objects and constraining sequential data are prepared. When there is necessary sequential data in neither of the sequential data storage unit 2 nor the constraining sequential data storage unit 3, sequential data serving as analysis objects and constraining sequential data which are lacking are input from the sequential data input unit 1. FIG. 1 shows an example of sequential data serving as analysis objects, and FIG. 2 shows an example of constraining sequential data. Hereinafter, processing in which frequently-appearing sequential data which include any of the constraining sequential data of FIG. 2, and whose support is 40% or more of a minimum support are extracted as a sequential pattern from the sequential data set of FIG. 1 will be described as an example.

Next, at step 2 (eliminate unnecessary sequential data), only sequential data including any of the constraining sequential data are taken out of a set of sequential data serving as analysis objects, and are stored as sequential data including constraint in the sequential data including constraint storage unit 4. Since a sequential pattern satisfying the sequential data constraint cannot be extracted from sequential data which do not include any constraining sequential data, this step is effective. Here, by storing information that each of sequential data including constraint includes which constraining sequential data, throughput can be reduced at subsequent step 5. On and after step 2, only sequential data including constraint are regarded as analysis objects. Further, constraining sequential data which are not included in any sequential data including constraint are eliminated from a constraining sequential data set. FIG. 5 is an example of sequential data including constraint. Since the sequential data of identification number 5 in FIG. 1 does not include any constraining sequential data, the sequential data is not included in the sequential data including constraint in FIG. 5. Further, since the constraining sequential data <(Inquiry, unfavorable comment), delivery> in FIG. 2 is not included in any sequential data including constraint, the constraining sequential data is eliminated from the constraining sequential data set, and the constraining sequential data set of FIG. 6 is obtained.

Next, at step 3 (generate single-sequential pattern candidates), a single-sequential subset is taken out of each sequential data including constraint, and a support is determined on the basis of the number of appearance in the sequential data including constraint. Thus, single-sequential data whose support is greater or equal to a minimum support are extracted as single-sequential pattern candidates. FIG. 7 shows single-sequential data taken out of the sequential data including constraint set of FIG. 5. Numbers inscribed on the right of the sequential data are the numbers showing how many sequential data including constraint which include each single-sequential data exist. For example, since <Review> is included in the sequential data of identification numbers 2, 3, 4, and 6 in FIG. 5, the number of times is 4. Even if the same sequential data appears many times in the same sequential data which is sequential data including constraint, it is counted one time. For example, two <Review> are included in the sequential data of identification number 6 in FIG. 5. However, the number of appearance of <Review> is regarded as, not two times, but one time. In this example, it is required to appear three times or more in order to have a support of 40% or more of the minimum support. FIG. 8 is single-sequential data set in which single-sequential data whose number of appearance is less than 3 are eliminated from the single-sequential data set of FIG. 7. This single-sequential data set is called "sequential pattern candidate set in single sequence" in the sense that the single-sequential data set can be a sequential pattern. A sequential pattern must be structured from sequential data included in a sequential pattern candidate set.

Next, at step 5 (eliminate unnecessary sequential data), on the basis of a result at step 3 or step 4, constraining sequential data and sequential data including constraint which are unnecessary for processing of sequential pattern extraction on and after this step are eliminated from the sequential data including constraint set and the constraining sequential data set, respectively. The conditions under which those are determined to be unnecessary constraining sequential data are two as follows.

[Unnecessary Constraining Sequential Data Conditions]

(a) Sequential data determined to be infrequently-appearing at step 3 or step 4 are included.

(b) No item in constraining sequential data is included in sequential data in a sequential pattern candidate set.

FIG. 9 is an example of a constraining sequential data set from which constraining sequential data <(Inquiry, favorable comment), delivery> including single-sequential data <Inquiry> determined to be infrequently-appearing at step 3 are eliminated. Moreover, since sequential data including constraint which include only the eliminated constraining sequential data are unnecessary for processing on and after this step, the sequential data including constraint are eliminated from the sequential data including constraint set. FIG. 10 is an example of a sequential data including constraint set in which the sequential data of identification number 1 which includes only the constraining sequential data <(Inquiry, favorable comment), delivery> has been eliminated from the sequential data including constraint of FIG. 5.

Next, at step 6 (recount sequential pattern candidates), when elimination of the sequential data including constraint is carried out at step 5, the number of appearance of the sequential data in the sequential pattern candidate set is counted up again, and sequential data whose number of appearance is less than the minimum support are eliminated from the sequential pattern candidate set. By eliminating unnecessary sequential data at step 5, it is possible for sequential data whose number of appearance is less than the minimum support to appear from among sequential data included in the sequential pattern candidate set. Sequential data which are sequential pattern candidates having the possibility that the number of appearance is less than the minimum support satisfy the following two conditions.

[Conditions for Recounting]

(a) A subset of sequential data including constraint eliminated at step 5

(b) The number of appearance <the number of appearance satisfying the minimum support+the number of eliminated sequential data including constraint In the case of the sequential pattern candidate set in FIG. 8, it is a subset of the sequential data including constraint of identification number 1 in FIG. 5, and sequential data whose number of appearance is less than 4 are counted up again. FIG. 11 is a result in which counting of number of appearance is carried out again. Since the supports are less than the minimum support, both are eliminated from the sequential pattern candidate set. FIG. 12 is an example of a sequential pattern candidate set from which sequential data whose number of appearance is less than the minimum support are eliminated by counting the number of appearance again.

Next, at step 7 (extract sequential pattern), sequential data including constraining sequential data among sequential data in the sequential pattern candidate set are extracted as a sequential pattern. An extracted sequential pattern may be stored in the sequential pattern storage unit 9, or may be output from the sequential pattern output unit 10. In this example, since the sequence length of constraining sequential data is 2, no sequential pattern in single-sequence is extracted.

When the sequential pattern candidate set at a point in time of completing step 7 is not empty, the extraction processing from step 4 to step 7 are continued until the sequential pattern candidate set is emptied. In this example, since the sequential pattern candidate set is not empty as shown in FIG. 12, the routine proceeds to step 4.

At step 4 (generate sequential pattern candidates), in addition to generation of an infrequently-appearing sequential data set, generation of a sequential pattern candidate set is carried out while pruning on the basis of an infrequently-appearing sequential data set, and pruning on the basis of counting of frequency of appearance and sequential data constraints are being carried out as needed. In generation of a sequential pattern candidate set, a plurality of new sequential pattern candidate sets are generated by elongating the sequence length due to self-join of a sequential pattern candidate set which has been generated already. A unit of elongating a sequence length is, for example, 1. When the supports of sequential data obtained by the self-join of a sequential pattern candidate set are greater than or equal to the minimum support, and the sequential data are not eliminated by pruning on the basis of sequential data constraints, the sequential data are made to be sequential pattern candidates of the sequence length.

Figure 13:
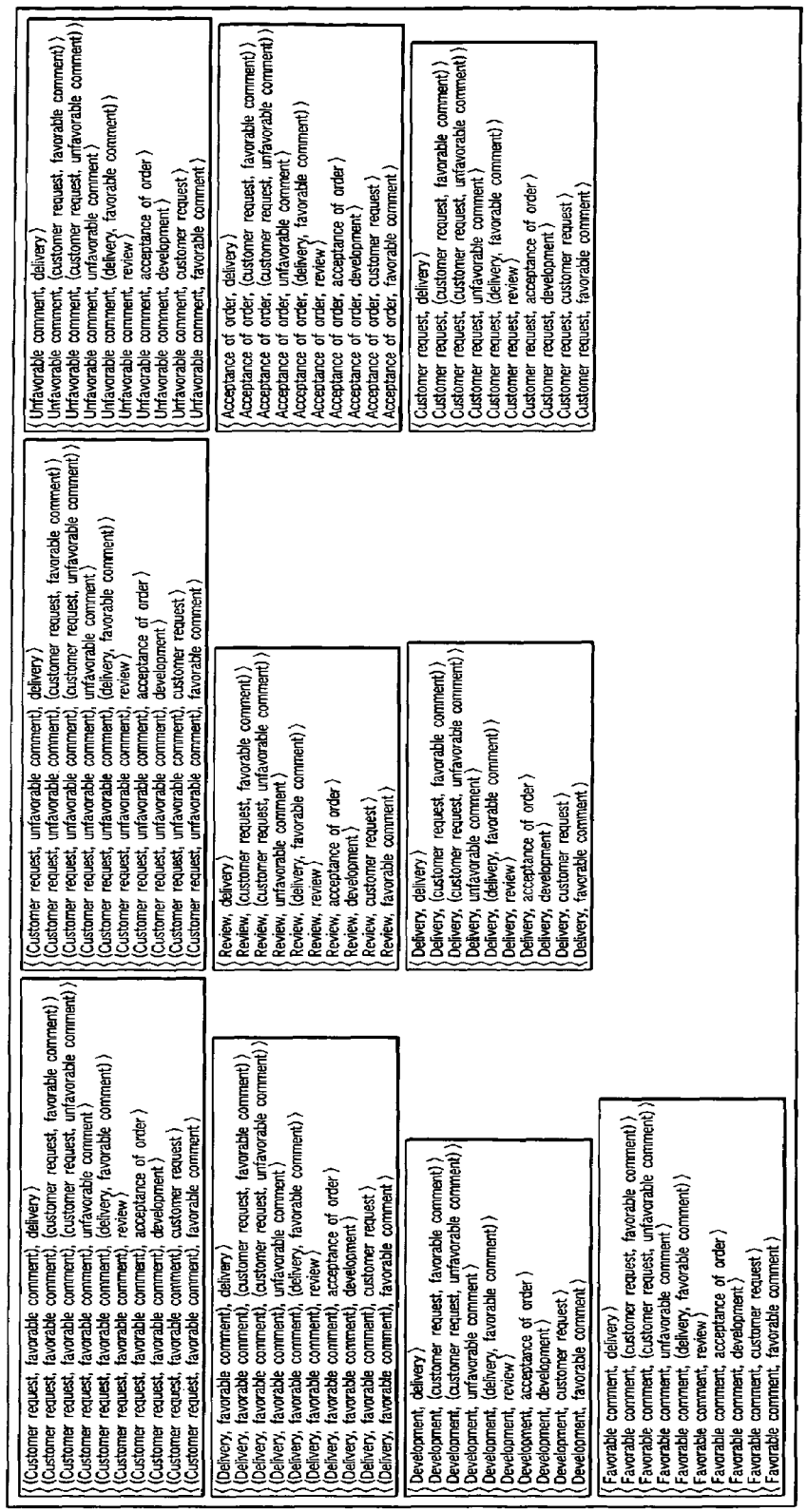
FIG. 13 is a diagram showing self-join of a single-sequential pattern set.

First, in order to generate a set of sequential pattern candidates whose sequence length is greater by about 1, self-join is carried out among sequential pattern candidate sets. FIG. 13 is a result in which self-join has been carried out among single-sequential pattern candidate sets in FIG. 12. "Self-join" is processing for generating combinations among the same sequential data sets. In self-join among single-sequential data, it suffices to generate double-sequential data by combining respective single-sequential data included in a sequential pattern candidate set. For example, <Development, delivery> and <Delivery, development> are generated from <Development> and <Delivery>. When an attempt is made to extract a sequential pattern in which the same item continuously appears, self-join processing is carried out between the same sequential data as well. For example, a result of self-join between both <Delivery> leads to <Delivery, delivery>. FIG. 13 is an example in which self-join in consideration of a case in which the same item continuously appears has been carried out.

In self-join between sequential pattern candidate sets with sequence length 2 or more, between both sequential data in which all the items except for the last items coincide with, the last item in one is added to the last item in the other. For example, in self-join between <Development, delivery> and <Development, acceptance of order>, <Development, delivery, acceptance of order> and <Development, acceptance of order, delivery> are generated. Note that, between <Development, delivery> and <Delivery, development>, since the items except for the last items are not coincided with one another, triple-sequential data are not generated. Further, when an attempt is made to extract a sequential pattern in which the same item continuously appears, self-join processing is carried out between the same sequential data as well. For example, a result of self-join between both <Development, delivery> leads to <Development, delivery, delivery>.

Next, since an increase in throughput is brought about by determining supports (frequencies of appearance) with respect to all sequential data generated due to self-join, the frequencies of appearance of only sequential pattern candidates from which a sequential pattern satisfying the sequential data constraint can be generated are determined. Then, sequential pattern candidates determined to have no possibility that a sequential pattern satisfying the sequential data constraint is generated are immediately eliminated from the sequential pattern candidate set. In addition to the condition for frequently-appearing that a support is greater than or equal to the minimum support, it suffices to satisfy one of the following three conditions in order to be sequential pattern candidates having the possibility that a sequential pattern satisfying the sequential data constraint is generated.

[Sequential Pattern Candidate Conditions]

(a) One of constraining sequential data including the order of the items thereof is completely included.

(b) All items, remaining after items of constraining sequential data which coincides with items except for the last item including the order thereof are eliminated from the constraining sequential data, are included in the last items of one candidate in a sequential pattern candidate set in which all items except for the last items coincide with one another.

(c) There are sequential data satisfying one condition of the above-described (a) and (b) in a sequential pattern candidate set whose all items except for the last items coincide with one another.

It can be said that sequential pattern candidates which do not satisfy the sequential pattern candidate conditions generate only a sequential pattern which does not satisfy the sequential data constraint, i.e., a sequential pattern which does not include constraining sequential data. With respect to the sequential pattern candidate conditions, inclusion relations of items are specified among sequential data forming sequential pattern candidates and the constraining sequential data.

First, it is determined whether the above-described sequential pattern candidate conditions (a) and (b) are satisfied, and when those are not satisfied, it is determined whether the condition (c) is satisfied. Then, a corresponding sequential data set is eliminated from the sequential pattern candidate set without carrying out frequency counting. It is called "pruning" based on the sequential data constraint that sequential data included in a sequential pattern candidate set are eliminated from the sequential pattern candidate set due to the fact that sequential data do not satisfy the sequential pattern candidate conditions.

As an example, block 1 in FIG. 14 will be considered. This is a set of double-sequential pattern candidates in which all the items <(Customer request, favorable comment)> except for the last items coincide with one another. First, since <(Customer request, favorable comment), delivery> included in the double-sequential pattern candidate set includes the constraining sequential data <(Customer request, favorable comment), delivery>, the sequential pattern candidate condition (a) is satisfied. At this time, all the sequential data in block 1 except for <(Customer request, favorable comment), delivery> satisfy the sequential pattern candidate condition (c). Accordingly, when a support of <(Customer request, favorable comment), delivery> is greater than or equal to the minimum support, it is determined that all the sequential data in block 1 have the possibility that a sequential pattern satisfying the sequential data constraint is generated.

Next, a case in which a support (frequency of appearance) of <(Customer request, favorable comment), delivery> is less than the minimum support will be considered. The single-sequential items <delivery> serving as a subset, remaining after the item <(Customer request, favorable comment)> of the constraining sequential data which is coincided with the items except for the last items including the order thereof are eliminated from the constraining sequential data <(Customer request, favorable comment), delivery>, are not included in the last item of any of the sequential pattern candidates in which all the items except for the last items coincide with one another. At this time, since there is no case in which all the sequential data in block 1 generate a sequential pattern satisfying the sequential data constraint, all the sequential data can be eliminated from the sequential pattern candidate set without carrying out frequency counting.

Next, block 2 shown in FIG. 14 will be considered as an example. This is a set of double-sequential pattern candidates in which all items <Review> except for the last items coincide with one another. First, there is no sequential data satisfying the sequential pattern candidate condition (a). Next, all the items <(Customer request, favorable comment)> and <delivery> of the constraining sequential data <(Customer request, favorable comment), delivery> from which nothing is eliminated because there is no item of constraining sequential data which is coincided with item <Review> except for the last items, are included in the last items of the sequential pattern candidates of <Review, delivery> and <Review, (customer request, favorable comment)> in which all the items except for the last items coincide with one another. Therefore, the sequential pattern candidate condition (b) is satisfied. In the same way, with respect to the constraining sequential data <(Customer request, unfavorable comment), delivery> as well, since the last items of <Review, delivery> and <Review, (customer request, unfavorable comment)> include <(customer request, unfavorable comment)> and <delivery>, the sequential pattern candidate condition (b) is satisfied.

Accordingly, when supports of <Review, delivery> and <Review, (customer request, favorable comment)> are greater than or equal to the minimum support, it is determined that all the sequential data in block 2 have the possibility that a sequential pattern satisfying the sequential data constraint of <(Customer request, favorable comment), delivery> is generated. In the same way, when supports of <Review, delivery> and <Review, (customer request, unfavorable comment)> are greater than or equal to the minimum support, it is determined that all the sequential data in block 2 have the possibility that a sequential pattern satisfying the sequential data constraint of <(Customer request, unfavorable comment), delivery> is generated.

Note that, even when a support of <Review, delivery> is less than the minimum support, or the support of <Review, delivery> is greater than or equal to the minimum support, when supports of <Review, (customer request, favorable comment)> and <Review, (customer request, unfavorable comment)> are less than the minimum support, all the sequential data in block 2 can be eliminated from the sequential pattern candidate set without carrying out frequency counting. When a sequential pattern candidate conditions is not satisfied, sequential data can be immediately eliminated from the sequential pattern candidate set. However, even if a sequential pattern candidate condition is satisfied, there is a possibility that the sequential data is determined to be infrequently-appearing. In this case, frequency counting is required.

Figure 15:
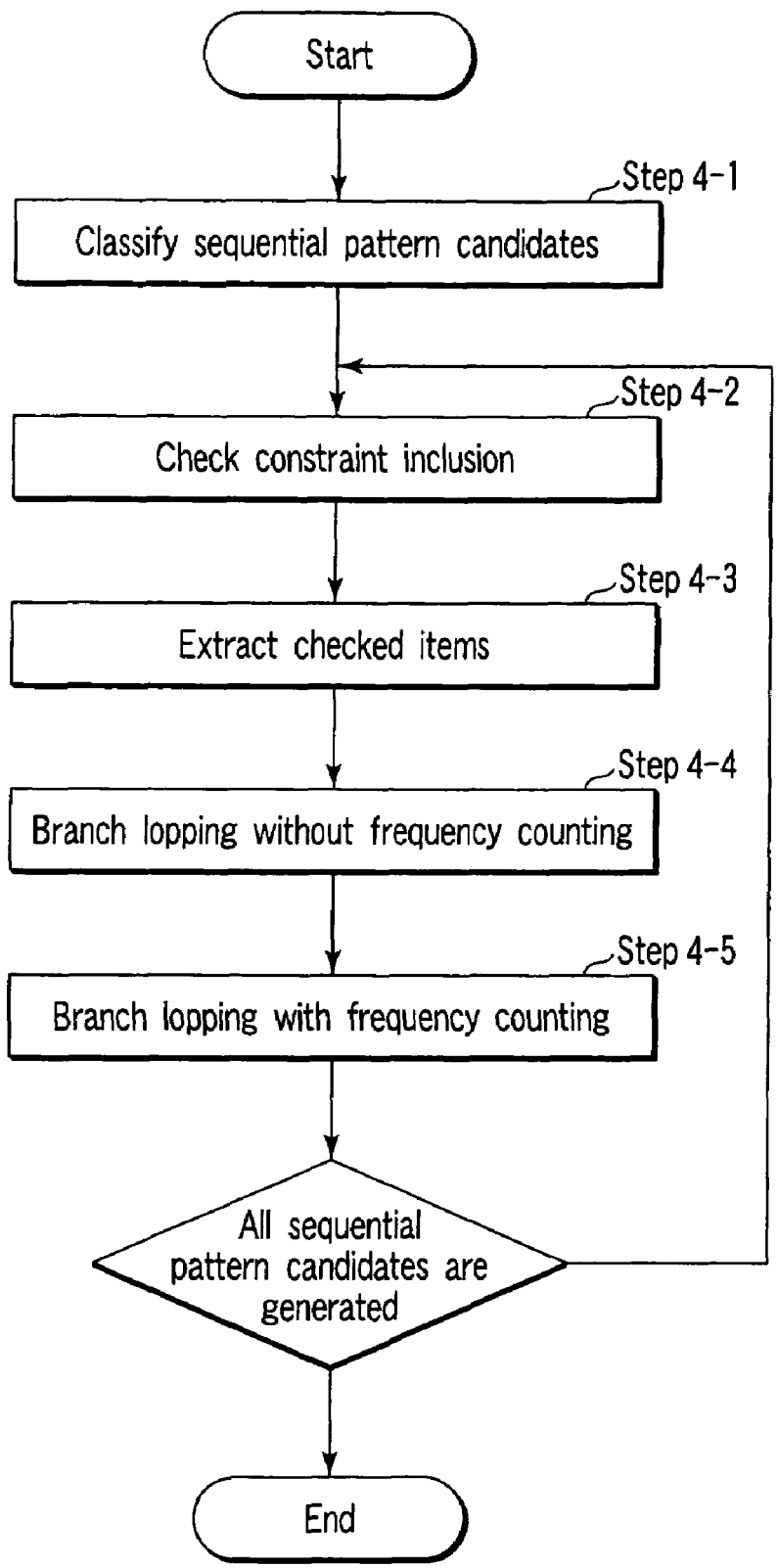
FIG. 15 is a flowchart showing the procedure of processing for generating sequential pattern candidates in the first embodiment of the present invention.

The procedure for generating sequential pattern candidates utilizing the characteristic described above will be described with reference to a flowchart of FIG. 15.

First, at step 4-1 (Classify sequential pattern candidates), a plurality of sequential pattern candidate sets are obtained by classifying many sequential pattern candidates generated due to self-join, in order to make sequential data easy to be referred in processing units. With respect to respective sequential data expressing a plurality of sequential pattern candidates in one sequential pattern candidate set, all the items except for the last items coincide with one another.

Figure 16:
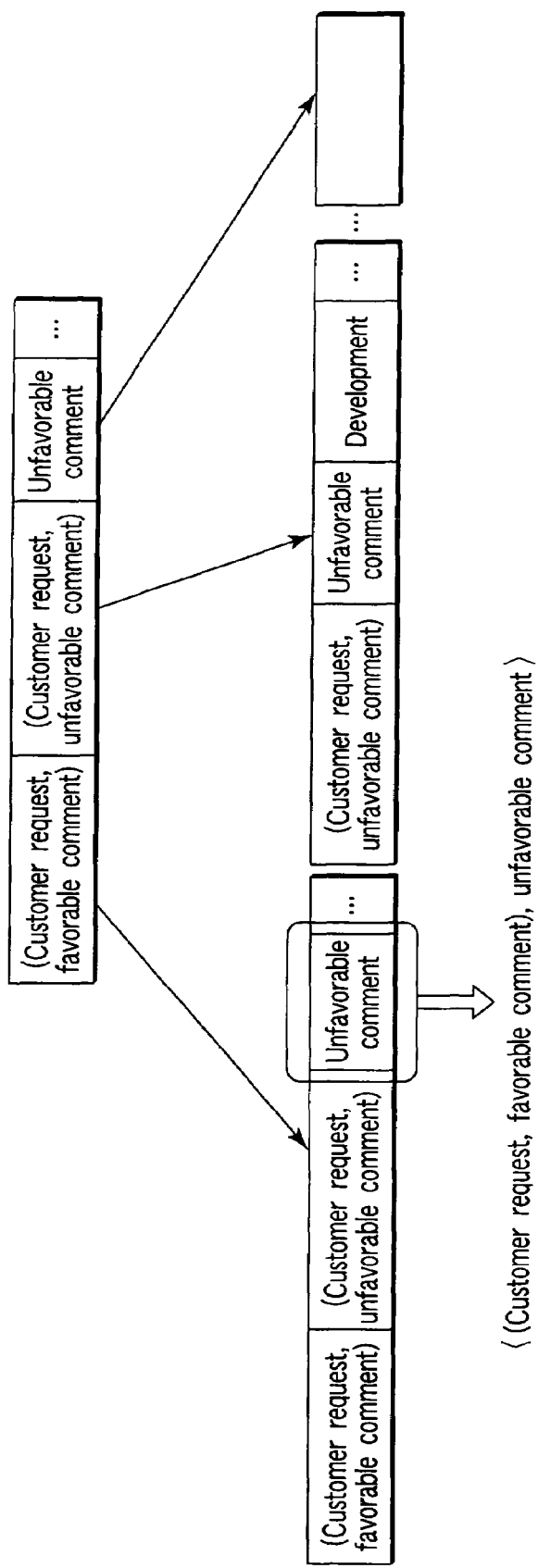
FIG. 16 is a diagram showing an example of sequential pattern candidates stored in a tree.

However, if the sequential pattern candidates are stored in a tree such as a hash-tree, a trie, a B-tree, or the like in accordance with an array of the items at the time of storing sequential pattern candidates, step 4-1 is unnecessary. FIG. 16 is an example when the sequential pattern candidates are stored in a tree. For example, it can be understood that, when <Unfavorable comment> is found by tracing a child node from a pointer which <(Customer request, favorable comment)> serving as a root node points, <(Customer request, favorable comment), unfavorable comment> is included in the sequential pattern candidates. Further, in order to obtain sequential pattern candidates with sequence length 3 including <(Customer request, favorable comment), unfavorable comment> in the first two items in sequential data, it suffices to check all items included in child nodes which can be traced from <(Customer request, favorable comment), unfavorable comment>.

Next, at step 4-2 (Check constraint inclusion), it is checked for every classified sequential pattern candidate set whether the respective items except for the last items and the respective items of the constraining sequential data inclusive of the order thereof coincide with one another.

Next, at step 4-3 (extract checked items), items which are proved to be coincided with one another at step 4-2 are eliminated from the respective constraining sequential data, and those are further decomposed into a subset of single-sequential data, and items are extracted.

Next, at step 4-4 (pruning without frequency counting), pruning is carried out every classified sequential data, and with respect to sequential data which have not been eliminated by the pruning, it is sequentially checked whether all the items generated at step 4-3 are included in the last one elements. Then, the items which do not satisfy the sequential pattern candidate conditions (a), (b), or (c) are eliminated from the sequential pattern candidate set.

The pruning processing here is processing in which, when infrequently-appearing sequential data are included in a subset of sequential pattern candidates, the sequential data are eliminated from the sequential pattern candidate set before frequency counting. Since there is no case in which sequential data including infrequently-appearing sequential data are determined to be frequently-appearing, the infrequently-appearing sequential data can be eliminated from the sequential pattern candidate set without carrying out frequency counting by carrying out pruning processing.

In conventional pruning processing, when one of subsets of sequential data onto which pruning processing has been carried out is not included in a sequential pattern candidate set whose sequence length is smaller by 1, the sequential data are generally eliminated from the sequential pattern candidate set. However, since there are sequential pattern candidates which are eliminated from the sequential pattern candidate set by pruning on the basis of the sequential data constraint even if the sequential pattern candidates are frequently-appearing, there is the possibility that the sequential pattern candidates are regarded as frequently-appearing by utilizing the conventional pruning processing as it is even if the sequential pattern candidates are infrequently-appearing. Then, pruning processing is carried out such that, sequential data with sequence length 2 or more which are determined to have supports less than the minimum support by frequency counting are stored as infrequently-appearing sequential data in advance in the infrequently-appearing sequential data storage unit 8, and sequential data including the infrequently-appearing sequential data as subsets are eliminated from the sequential pattern candidate set. The infrequently-appearing sequential data can be efficiently referred to by being stored in a hash-tree, a trie, or the like, in the same way as the sequential pattern candidates.

Next, at step 4-5 (pruning with frequency counting), frequency counting is carried out for every classified sequential data with respect to the sequential pattern candidate set passing through the processing at step 4-4, and with respect to the sequential data whose supports (frequency of appearance) are greater than or equal to the minimum support, it is sequentially checked whether all the items generated at step 4-3 are included in the last one elements. Thus, sequential data which do not satisfy the sequential pattern candidate conditions (a), (b), and (c) are eliminated from the sequential pattern candidate set. Further, in the sequential pattern candidate set, when certain sequential data are included in other different sequential data, if (the latter) sequential data to include are frequently-appearing, (the former) sequential data to be included as well are frequently-appearing. At this time, when the sequential data to be included do not include constraining sequential data, frequency counting is not necessarily carried out. For example, <Customer request, acceptance of order> is included in <(Customer request, favorable comment), acceptance of order>. At this time, if <(Customer request, favorable comment), acceptance of order> is frequently-appearing, <Customer request, acceptance of order> can be determined to be frequently-appearing, which does not require frequency counting.

In generation of sequential pattern candidates, classified sequential data sets are processed in the following order.

(1) Classified sequential data set included in a constraining sequential data set.

(2) Classified sequential data set with high frequency of appearance in the constraining sequential data set.

(3) Classified sequential data set whose number of item sets at the same order position is large.

Accordingly, it is preferable for the sequential pattern candidates to be sorted and stored in a data structure suitable for referring to respective sequential data in the above-described order. For example, when a tree such as a hash-tree or a B+tree is used as a data structure in which sequential pattern candidates are stored, it suffices for respective items stored in nodes to be arranged as a standard as described above.

Generation of sequential pattern candidates will be described while more concrete examples are shown.

The sequential pattern candidate sets shown in FIG. 13 are sequential pattern candidate sets after completing the processing at step 4-1.

Figure 17:
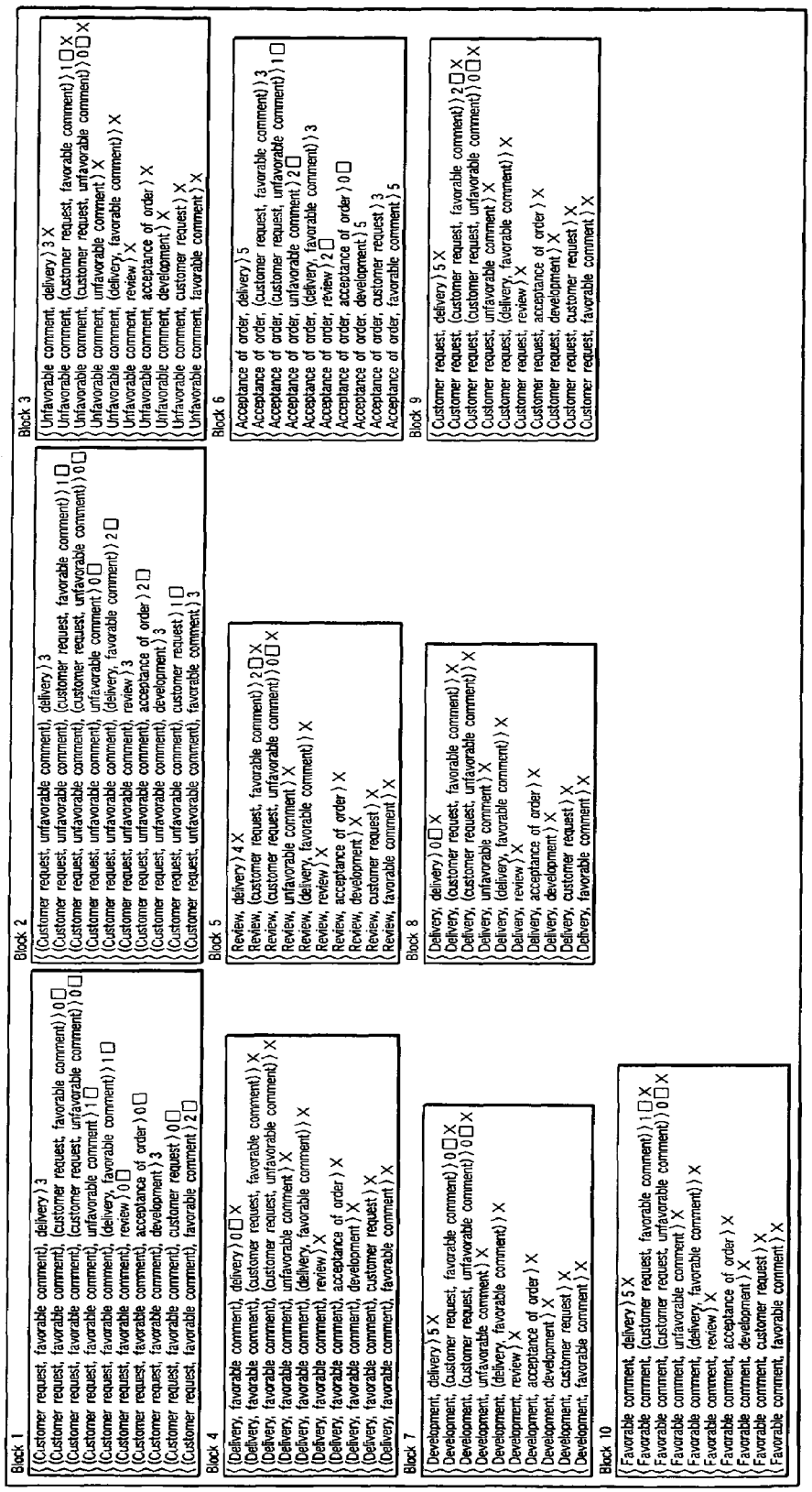
FIG. 17 is a diagram showing self-join of a single-sequential pattern set.

FIG. 17 shows a result that the processing at step 4-5 has been carried out with respect to the sequential data sets in FIG. 13. Suppose that frequency counting is carried out in order from the sequential data at the head in a block. Numeric values on the right of the sequential data are the numbers of appearance, and show sequential data onto which counting of frequency of appearance has been carried out. Sequential data in which "x" are inscribed to the right thereof are the sequential data eliminated from the sequential pattern candidate set by carrying out pruning with frequency counting. Sequential data in which "□" are inscribed to the right thereof are sequential data which have been determined to be infrequently-appearing as a result of frequency counting.

For example, in block 1, since <(Customer request, favorable comment), delivery> is frequently-appearing, the sequential pattern candidate condition (a) is satisfied, and all the sequential data in block 1 satisfy the sequential pattern candidate condition (c). Accordingly, frequency counting has been carried out with respect to all the sequential data in block 1.

In block 3, since <Unfavorable comment, (customer request, favorable comment)> and <Unfavorable comment, (customer request, unfavorable comment)> are infrequently-appearing, the sequential pattern candidate conditions are not satisfied, and the sequential data set of block 3 is eliminated from the sequential pattern candidate set.

Figure 18:
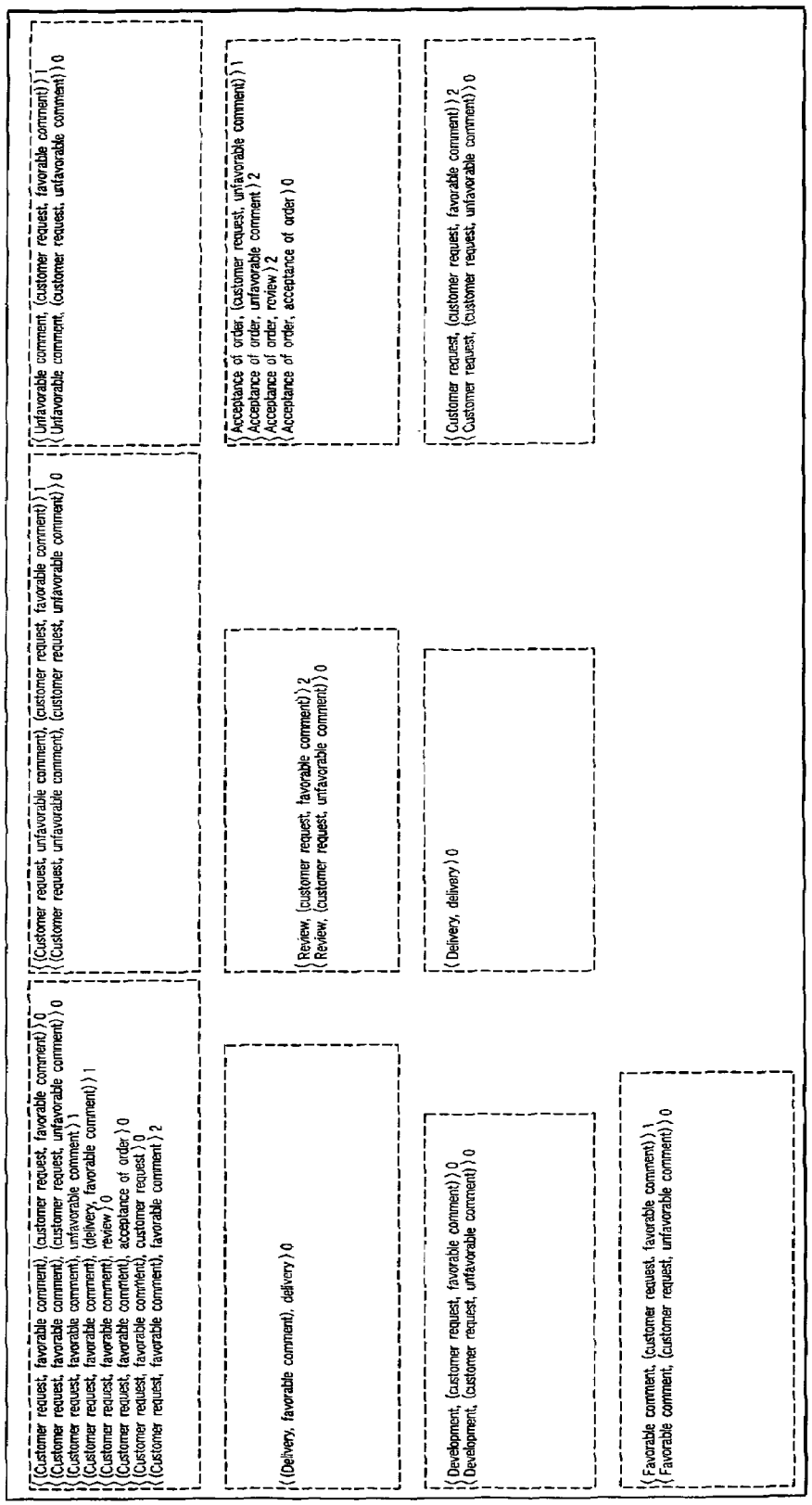
FIG. 18 is a diagram showing an infrequently-appearing sequential data set.
Figure 19:
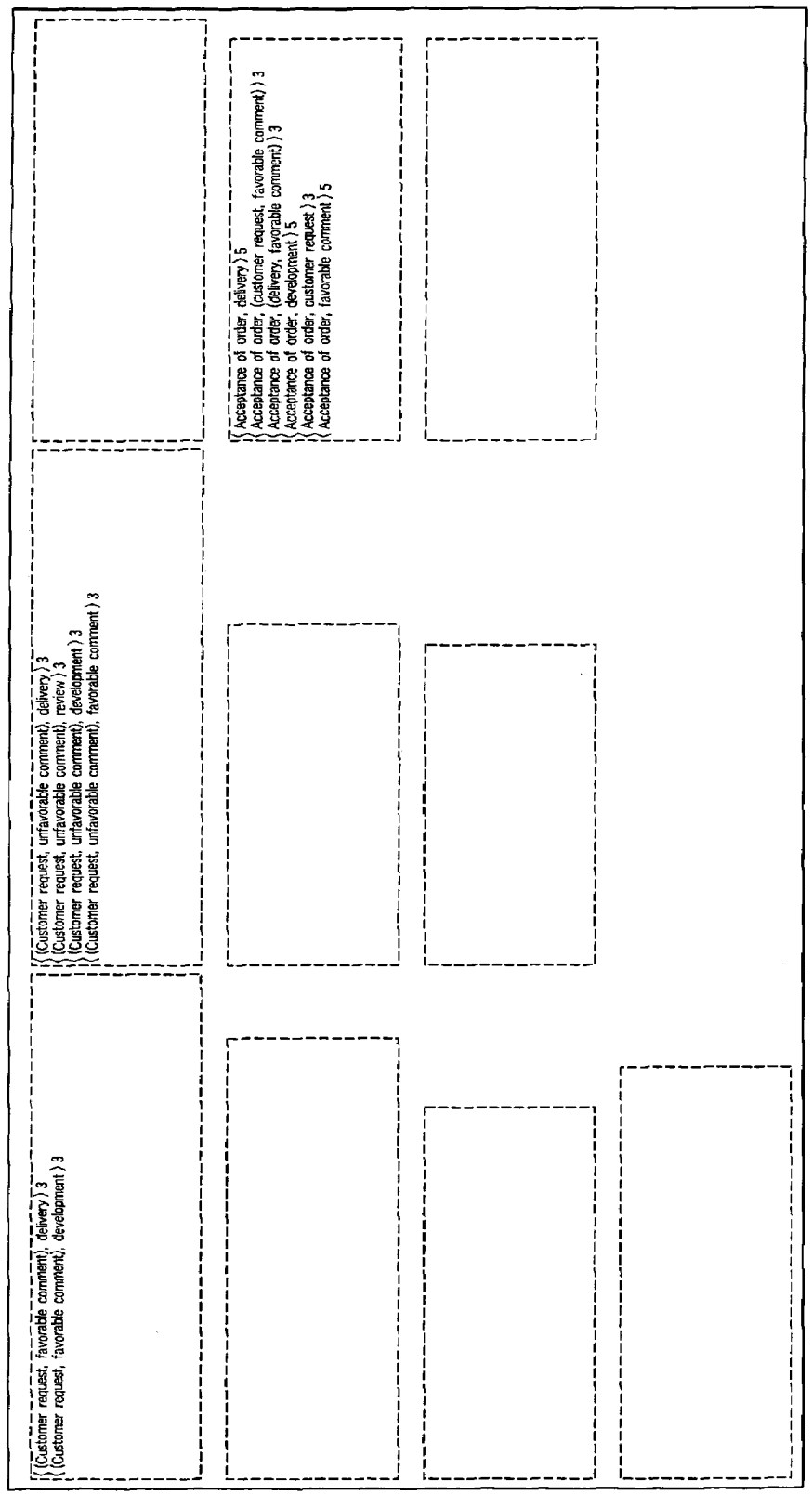
FIG. 19 is a diagram showing a set of sequential pattern candidates with sequence length 2.
Figure 21:
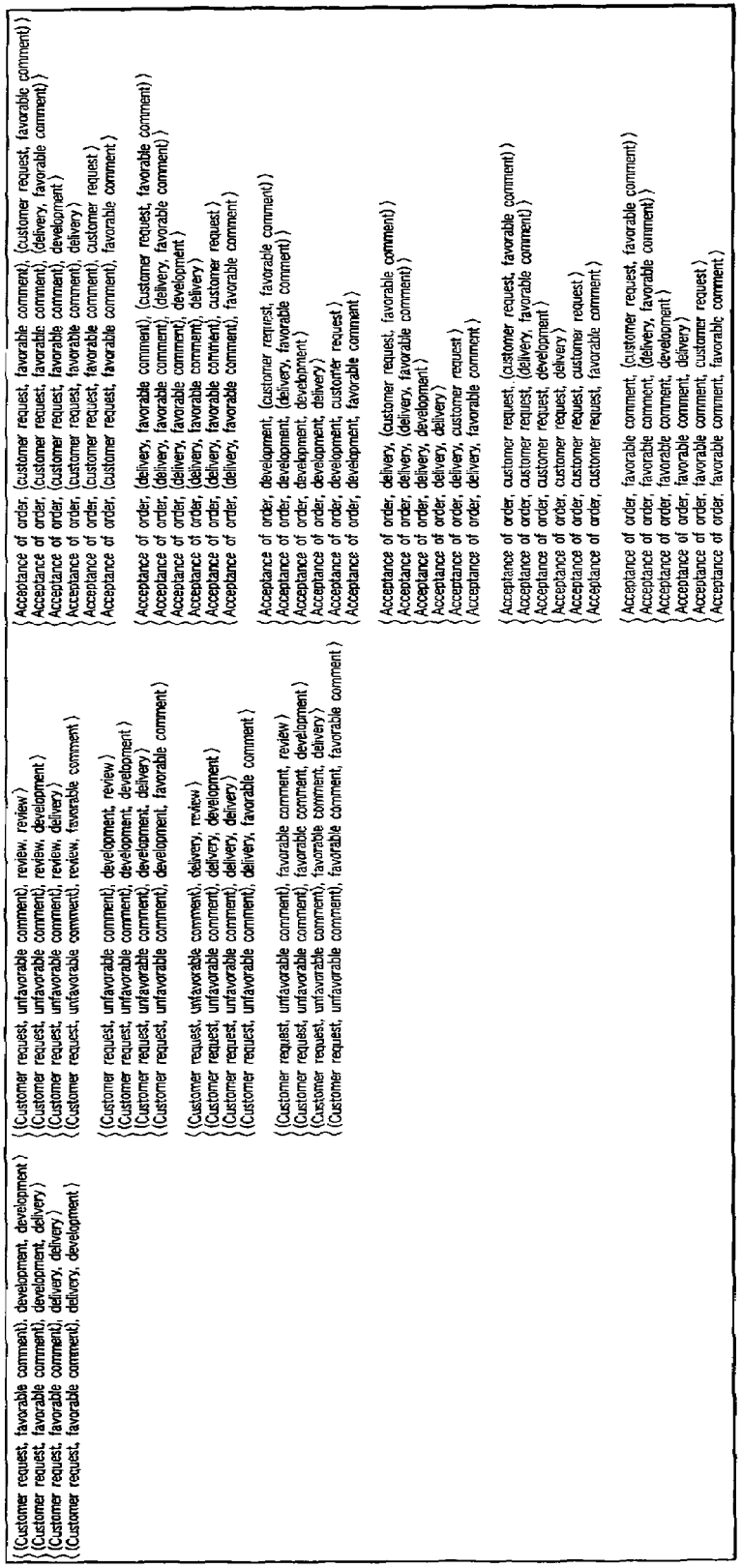
FIG. 21 is a diagram showing self-join of a double-sequential pattern candidate set.

Note that, since an infrequently-appearing sequential data set is not prepared at the time of generating sequential pattern candidates with sequence length 2, only pruning at step 4-5 is carried out. Namely, when new candidates with sequence length 3 or more are generated, both of pruning at steps 4-4 and 4-5 are executed. FIG. 18 is sequential data determined to be infrequently-appearing by carrying out frequency counting. Further, FIG. 19 is a diagram in which sequential pattern candidates with sequence length 2 are sorted out.

Figure 22:
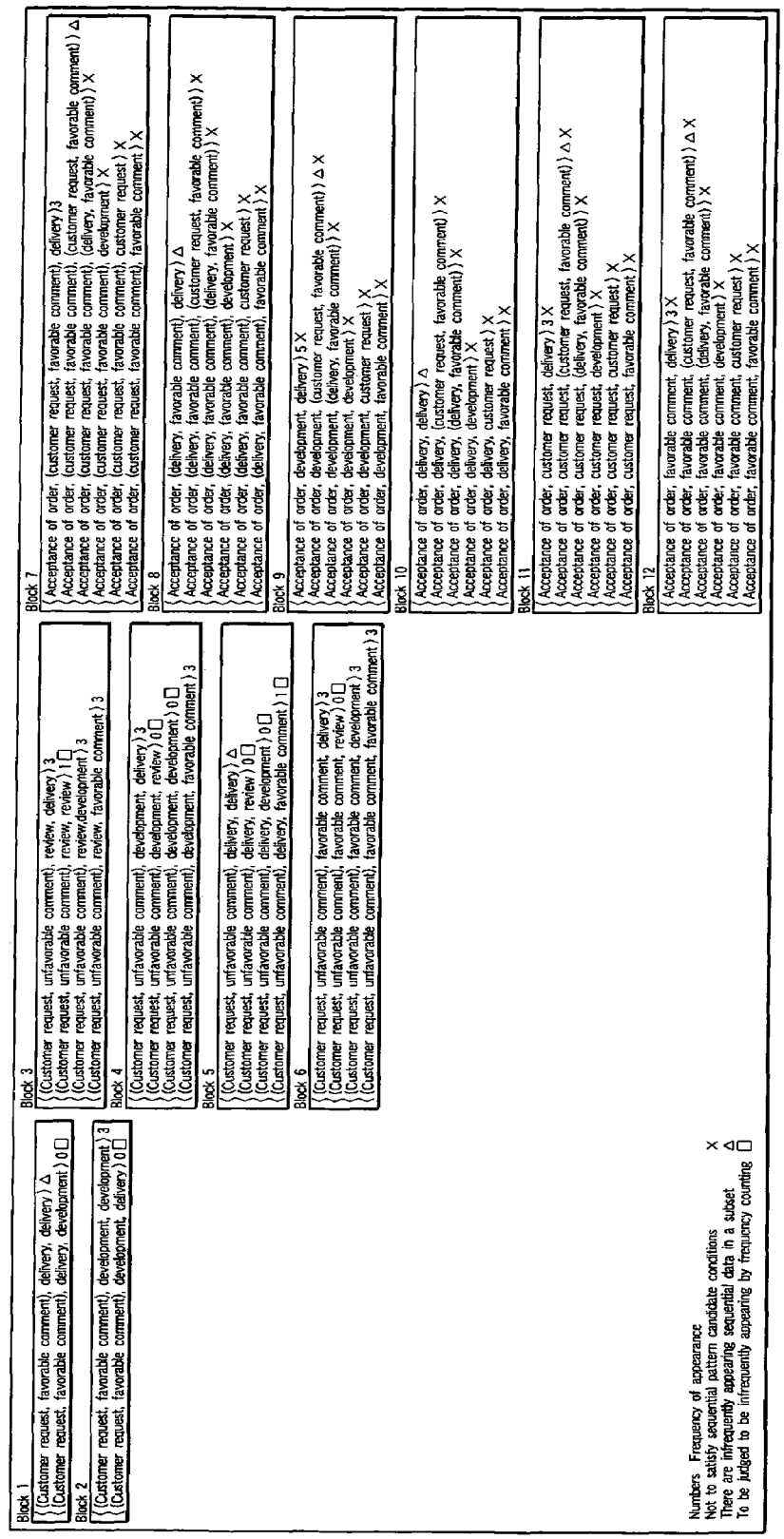
FIG. 22 is a diagram showing generation of a triple-sequential pattern candidate set.
Figure 27:
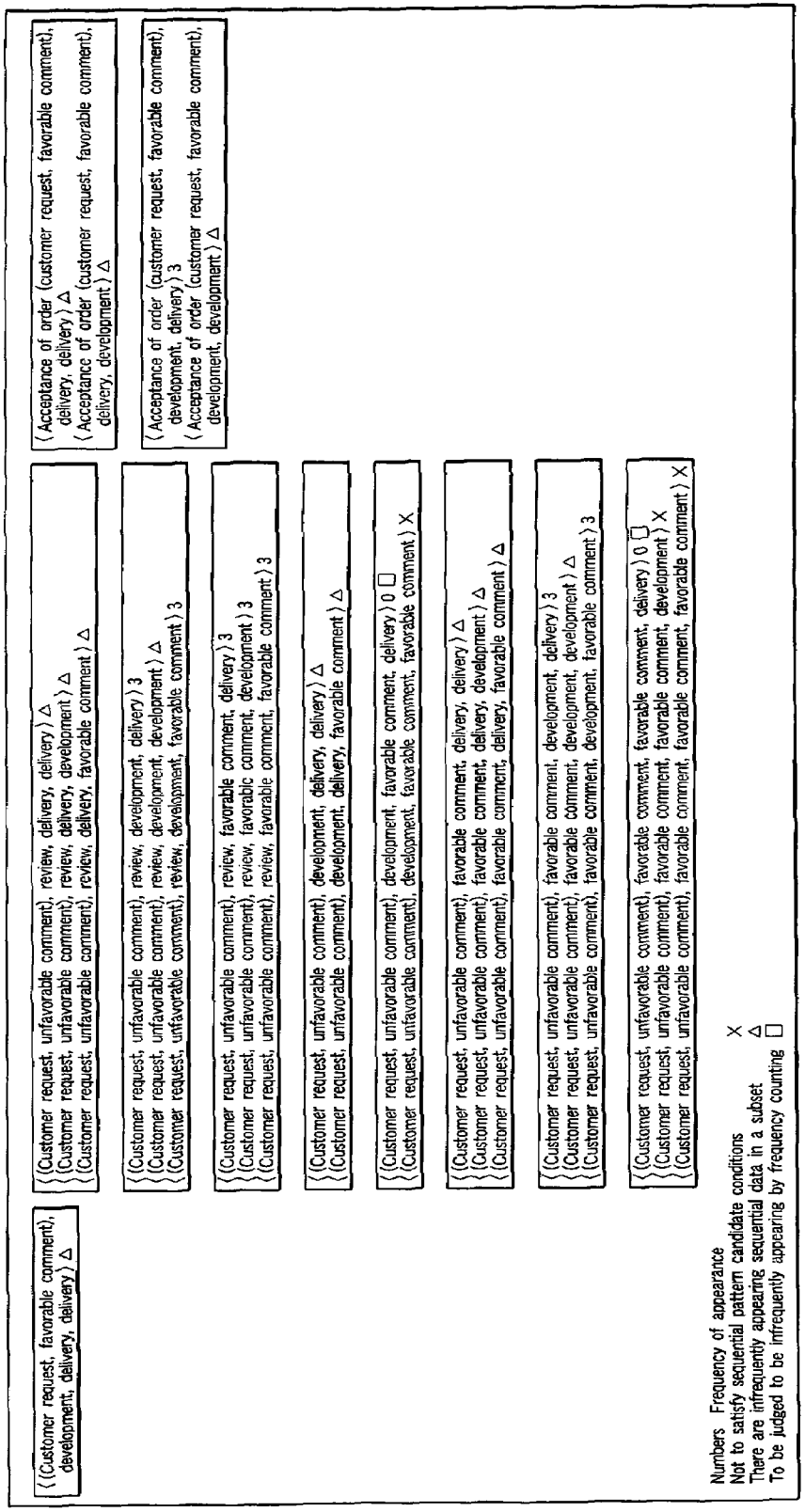
FIG. 27 is a diagram showing generation of sequential pattern candidates with sequence length 4.

As an example including pruning without frequency counting, generation of sequential pattern candidates with sequence length 3 of FIG. 22 is considered. Notations are the same as those used in FIG. 17. However, in addition thereto, the sequential data in which "Δ" are inscribed to the right thereof are sequential data which are eliminated from the sequential pattern candidate set because the infrequently-appearing sequential data are included as a subset. For example, in block 8, since <(delivery, favorable comment), delivery> which is a subset of <Acceptance of order, (delivery, favorable comment), delivery> is included in the infrequently-appearing sequential data in FIG. 18, it is eliminated from the sequential pattern candidate set. When <Acceptance of order, (delivery, favorable comment), delivery> is eliminated, since the sequential pattern candidate condition (b) is not satisfied, the sequential data set of block 8 is eliminated from the sequential pattern candidate set.

As shown in FIG. 4, after completing step 4, the routine proceeds to step 5, step 6, and step 7 sequentially. As a result of applying the processing at step 5 to the sequential pattern candidate set in FIG. 19, neither of the unnecessary constraining sequential data conditions (a) nor (b) are satisfied. Therefore, there is no change in the sequential data including constraint or the constraining sequential data. Accordingly, recounting of frequency at step 6 is not carried out, either. FIG. 20 shows a result in which the processing at step 7 has been applied to the sequential pattern candidate set in FIG. 19, and this corresponds to a sequential pattern with sequence length 2.

When the sequential pattern candidate set is empty when step 7 is completed, it is determined that all the sequential patterns are extracted, and the sequential pattern extraction processing is completed. When the sequential pattern candidate set is not empty, the routine returns to step 4, and the same steps are repeated until the sequential pattern candidate set is emptied. FIGS. 21 to 36 show processes until all the sequential patterns are extracted by repeating the above steps sequentially. FIG. 36 is a diagram in which extracted sequential patterns are sorted out.

In the present embodiment, the case is cited as one example in which a method for generating sequential pattern candidates which generates sequential pattern candidates by elongating a sequence length due to sequential data in which all the items except for the last items in each sequential data coincide with one another being made to be self-joined is used. However, embodiments of the present invention are effective in other methods for generating sequential pattern candidates as well. For example, embodiments of the present invention are effective in a method for generating sequential pattern candidates which generates sequential pattern candidates with sequence length greater by 1 due to sequential data in which all the items except for the first items in each sequential data coincide with one another being made to be self-joined. Further, the present invention is effective in a method for generating sequential pattern candidates which generates sequential pattern candidates with sequence length greater by 1 by adding the last item of the latter to the former, with respect to two sequential data in which all the items except for the first items and all the items except for the last items coincide with one another.

In the above sequential pattern extraction processing, more favorable results can be obtained by carrying out parallel processing by a plurality of processors or distributed processing by a plurality of calculators. In particular, the frequency counting at step 3 or step 4 can be independently carried out so as to be in parallel and distributed for every sequential pattern candidate.

As described above, in accordance with the sequential pattern extracting apparatus of the first embodiment, the sequential pattern candidates which generate only a sequential pattern which does not satisfy the sequential data constraint are eliminated as needed from the sequential pattern candidate set. Thus, a processing time can be shortened by greatly reducing unnecessary processing, and it is possible to extract sequential patterns including specified sequential data without omission.

Second Embodiment

FIG. 37 is a schematic block diagram of a sequential pattern extracting apparatus according to a second embodiment of the present invention. Hereinafter, the outline of processing and the relationship among the respective components will be described on the basis of FIG. 37.

A sequential data input unit 21 inputs information from the outside as sequential data serving as analysis objects onto which extraction of sequential pattern is carried out. Provided that the above-described function is provided, an input device can carry out optimum selection in accordance with use, and may be a keyboard, a mouse, a pen-type input device, or a sensor.

A sequential data storage unit 22 stores sequential data from which a sequential pattern is extracted. There is a case in which sequential data is stored in advance, or there is a case in which sequential data input from the sequential data input unit 21 is stored. Provided that the above-described function is provided, a storage device and a storage medium can carry out optimum selection in accordance with use, and database may be used, text data may be used, or data in a format specified in each application may be used.

A constraining sequential data storage unit 23 stores sequential data which must be included in a sequential pattern to be extracted, as constraining sequential data, among sequential data stored in the sequential data storage unit 22, sequential data input from the sequential data input unit 21, and both of the sequential data. Moreover, sequential data which are unnecessary for processing for generating a sequential pattern, which are specified by a sequential data decomposition unit 24 are eliminated. Provided that the above-described function is provided, in the same way as the sequential data storage unit 22, a storage device and a storage medium can carry out optimum selection in accordance with use.

The sequential data decomposition unit 24 takes out sequential data from the sequential data input unit 21, the sequential data storage unit 22, and the constraining sequential data storage unit 23, and prepares partial-sequential data by decomposing analysis object sequential data.

A partial-sequential data storage unit 25 stores partial-sequential data generated by the sequential data decomposition unit 24.

A sequential data including constraint storage unit 26 stores respective constraining sequential data stored in the constraining sequential data storage unit 23, and analysis object sequential data so as to be associated with one another. Since analysis object sequential data which does not include any constraining sequential data is not used for sequential pattern extraction processing, the analysis object sequential data is not stored. Provided that the above-described function is provided, in the same way as the sequential data storage unit 22, a storage medium can carry out optimum selection in accordance with use.

A partial-sequential pattern extracting unit 27 takes out partial-sequential data from the partial-sequential data storage unit 25, and extracts a partial-sequential pattern.

A partial-sequential pattern storage unit 28 stores a partial-sequential pattern generated at the partial-sequential pattern extracting unit 27. Provided that the above-described function is provided, in the same way as the sequential data storage unit 22, a storage medium can carry out optimum selection in accordance with use.

A partial-sequential pattern merging unit 29 takes out sequential data from the sequential data including constraint storage unit 26, the constraining sequential data storage unit 23, and the partial-sequential pattern storage unit 28, and extracts a sequential pattern by merging constraining sequential data and partial-sequential pattern.

A sequential pattern storage unit 30 stores a sequential pattern extracted at the partial-sequential pattern extracting unit 27 or the partial-sequential pattern merging unit 29. Provided that the above-described function is provided, in the same way as the sequential data storage unit 22, a storage device and a storage medium can carry out optimum selection in accordance with use.

A sequential pattern output unit 31 outputs a sequential pattern extracted at the partial-sequential pattern extracting unit 27 or the partial-sequential pattern merging unit 29. Provided that the above-described function is provided, an output device can carry out optimum selection in accordance with use, and may be a display, a printer, or a mobile terminal device. Further, provided that the above-described function is provided, an output method can carry out optimum selection in accordance with use, and batch output, serial output, or sort output according to a support or confidence can be assumed.

FIG. 38 is a flowchart showing the procedure of processing for extracting a sequential pattern according to the second embodiment of the present invention. Hereinafter, the procedure of processing for extracting a sequential pattern will be described with reference to FIG. 38.

First, at step 1 (prepare sequential data), sequential data serving as analysis objects and constraining sequential data are prepared. When there is no necessary sequential data in the sequential data storage unit 22 or the constraining sequential data storage unit 23, sequential data serving as analysis objects and constraining sequential data which are lacking are input from the sequential data input unit 21. Further, FIG. 1 shows an example of sequential data serving as analysis objects, and FIG. 2 is an example of constraining sequential data. Hereinafter, processing in which a sequential pattern which includes one of the constraining sequential data of FIG. 2, and whose support is 40% or more of the minimum support is extracted from the sequential data set of FIG. 1 will be described as an example.

Next, at step 2 (divide sequential data), sequential data are divided into partial sequences with items of the constraining sequential data being as boundaries. The items of the constraining sequential data serving as the boundaries are not included in the divided sequential data. For example, when <Development> is constraining sequential data, <Acceptance of order, development, operation> is decomposed into <Acceptance of order> and <Operation>. If there is a plurality of items at a divided position, an item set in which only items of constraining sequential data are eliminated from an item set at the divided position is included in only one of the divided sequential data. It is determined in advance whether the item set is included in sequential data before or after the divided position.

The item set in which only items of constraining sequential data are eliminated from an item set at a divided position is handled so as to be different from usual items. For example, when it is determined that an item set at a divided position is included in the sequential data before the divided position, and <Development> is constraining sequential data, <Trouble, acceptance of order, (development, trouble), operation> is divided into <Trouble, acceptance of order, *trouble> and <Operation>. Here, "*" is added to <trouble> at the divided position in order to show a difference from a usual <Trouble>, and is inscribed as <*trouble>. At the time of frequency counting, <Trouble> and <*trouble> are counted up as separate items.

When a plurality of items of constraining sequential data are included in sequential data serving as an object to be divided, it is determined in advance that the sequential data is divided at the first or last item. In accordance therewith, uniqueness in division is maintained, and double counting of the same item can be avoided. For example, in the case where it is determined in advance that the sequential data is divided at the first item, when <Development, delivery, development, delivery, operation> is divided at the constraining sequential data <delivery>, the <Development, delivery, development, delivery, operation> is divided into <Development> and <Development, delivery, operation>. The sequential data in FIG. 1 is divided as in FIG. 39 in accordance with the procedure at step 1. Sequential data enclosed with quadrangles are partial-sequential data which have been decomposed, and items enclosed with rounded-corner quadrangles are items of constraining sequential data. Note that, in order to show which sequential data corresponds to which constraining sequential data, identification numbers are added to the left of the sequential data which have been decomposed of FIG. 39. Analysis object sequential data are stored as sequential data including constraint so as to correspond to respective constraining sequential data. For example, in FIG. 39, sequential data including constraint corresponding to constraining sequential data <(Customer request, favorable comment), delivery> are only the sequential data of identification numbers 2, 6, and 7.

Figure 39:
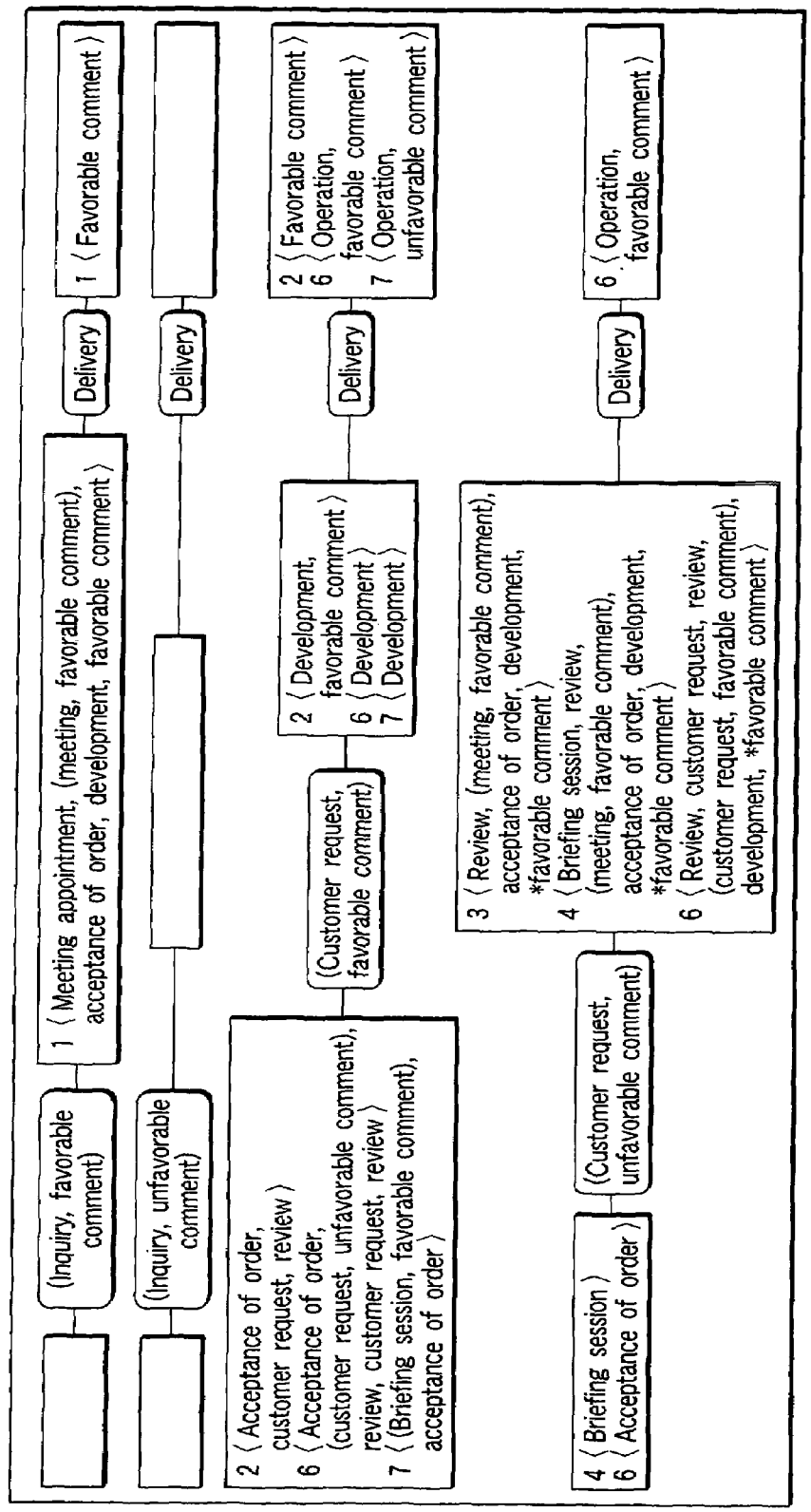
FIG. 39 is a diagram showing partial-sequential data.
Figure 40:
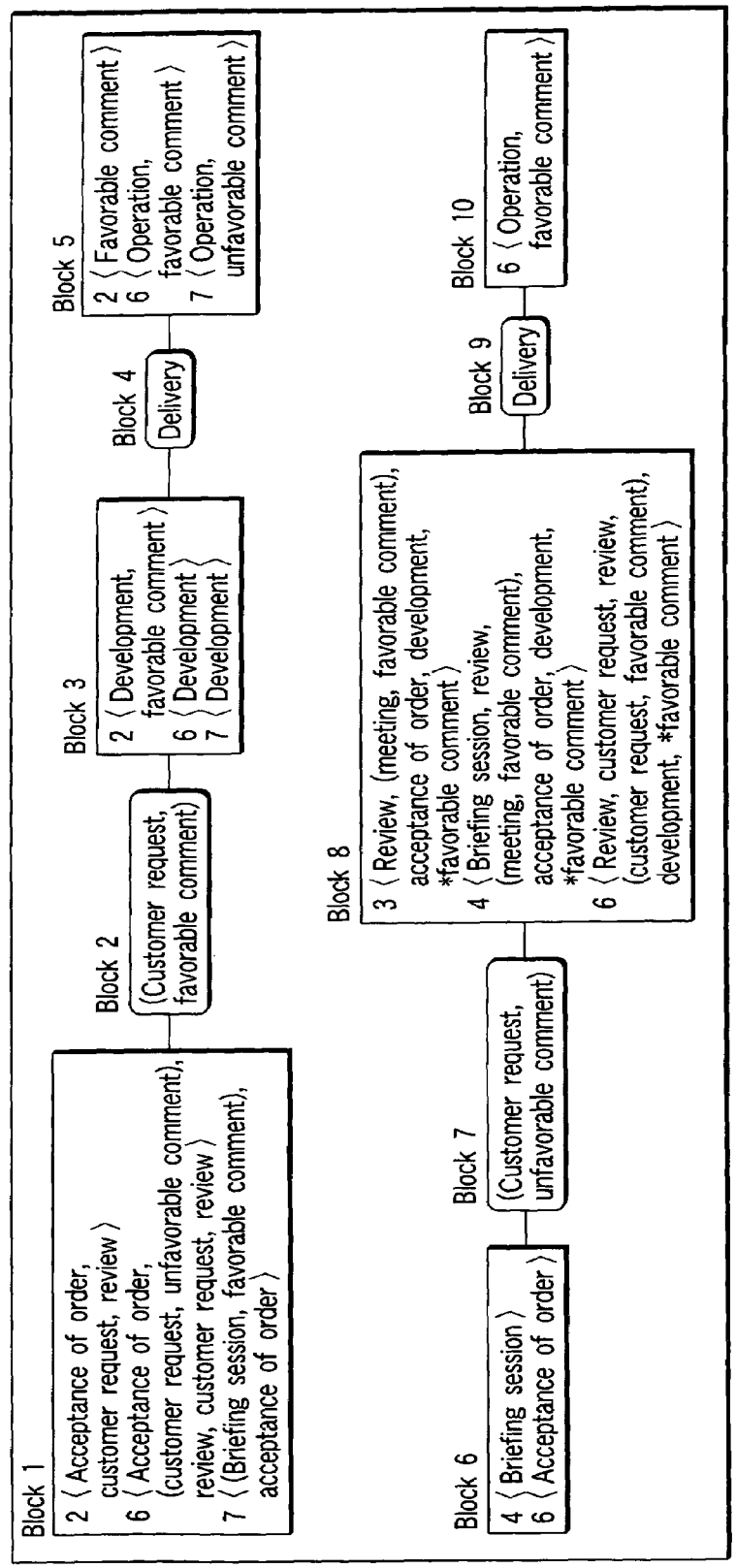
FIG. 40 is a diagram showing partial-sequential data from which unnecessary sequential data have been eliminated.

Next, at step 3 (eliminate unnecessary sequential data), constraining sequential data from which a sequential pattern cannot be extracted are eliminated from a constraining sequential data set. In the divided sequential data in FIG. 39, there is only one partial-sequential data corresponding to <(Inquiry, favorable comment, delivery>, and there is no partial-sequential data corresponding to <(Inquiry, unfavorable comment), delivery>. Then, since <(Inquiry, favorable comment, delivery> and <(Inquiry, unfavorable comment, delivery> are made unnecessary for the processing on and after this step, those are eliminated from the constraining sequential data set. FIG. 39 becomes FIG. 40 in accordance with the procedure at step 2.

Next, at step 4 (generate partial-sequential pattern), a sequential pattern determined for every divided sequential data is extracted as a partial-sequential pattern. Sequential pattern extraction processing for respective partial-sequential data can be independently executed. Further, any sequential pattern extraction method which is a technique for extracting frequently-appearing sequential data may be used, and an optimum technique can be selected in accordance with a characteristic of partial-sequential data, calculator resources, a purpose of an analyst, or the like. Sequential data in which one partial-sequential pattern and constraining sequential data are combined is extracted as a sequential pattern. At that time, a support of the sequential pattern is the same as a support of the partial-sequential pattern. Further, constraining sequential data itself is extracted as a sequential pattern, and the number of appearance is the same as a maximum number of sequential data. For example, the number of appearance of <(Customer request, unfavorable comment), delivery> is equal to 3 which is the number of sequential data in the block 8 having the maximum number of sequential data among the blocks 6, 8, and 10 in FIG. 40.

FIGS. 41 to 49 are examples in which a sequential pattern extracting method using apriority is applied to each partial-sequential data. As described above, "apriority" is a characteristic that there is no case in which a frequency of any subset of sequential data is made higher than a frequency of the sequential data.

Figure 41:
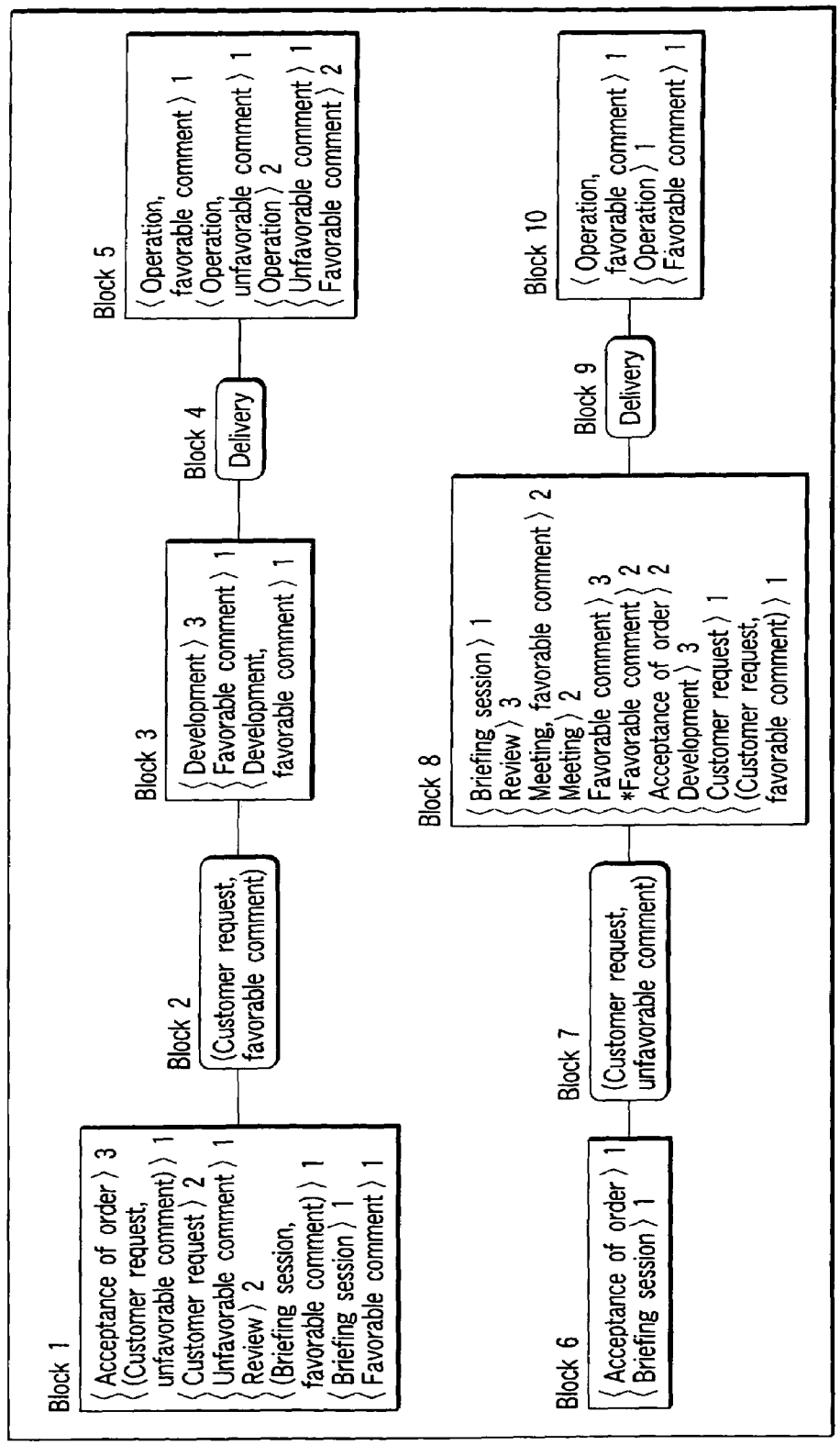
FIG. 41 is a diagram showing partial-sequential pattern extraction (frequency counting of single-sequential pattern)
Figure 44:
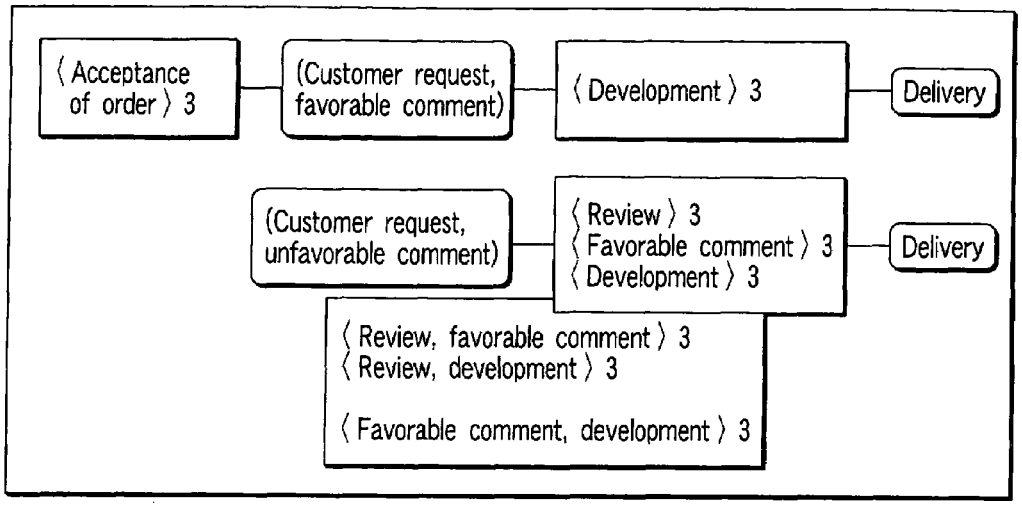
FIG. 44 is a diagram showing partial-sequential pattern extraction (double-sequential pattern candidates)
Figure 45:
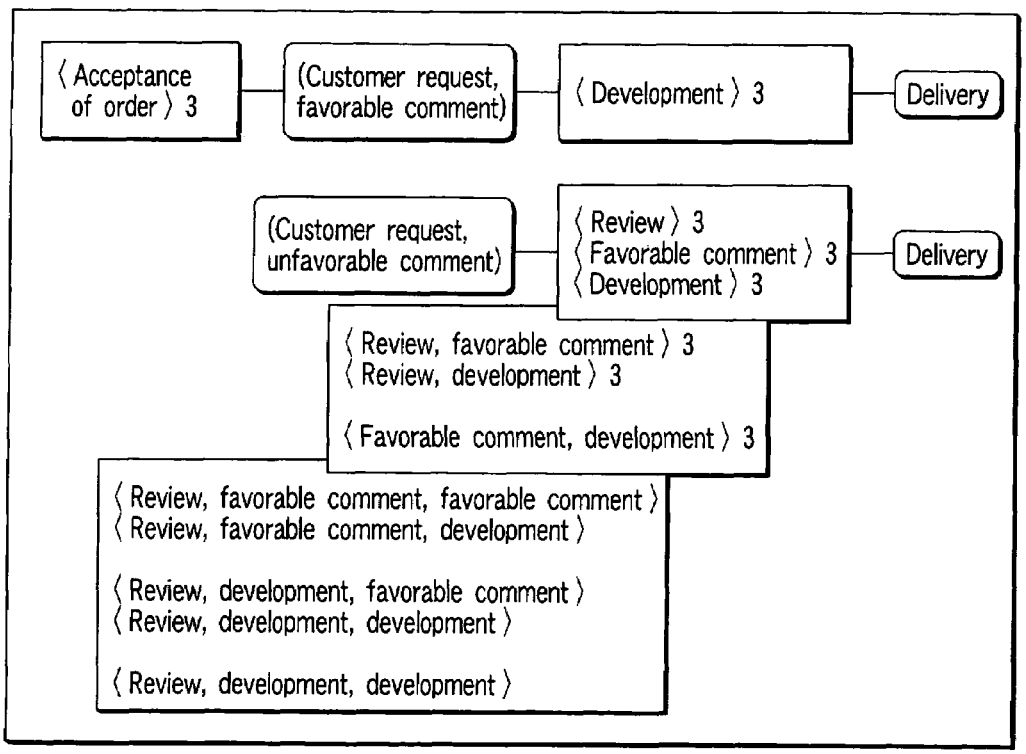
FIG. 45 is a diagram showing partial-sequential pattern extraction (self-join of triple-sequential pattern candidates)
Figure 46:
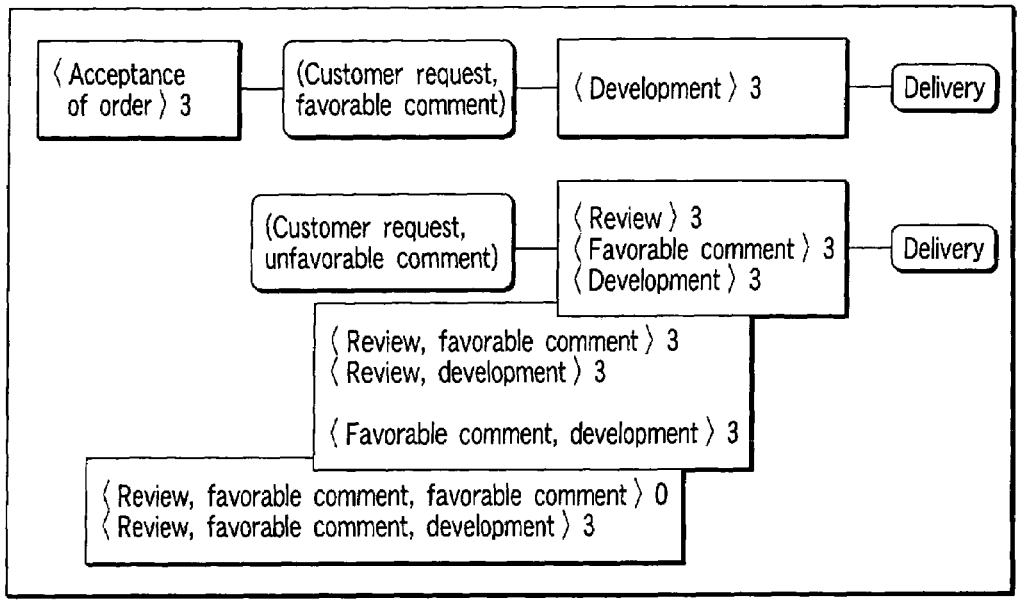
FIG. 46 is a diagram showing partial-sequential pattern extraction (frequency counting of triple-sequential pattern candidates)
Figure 47:
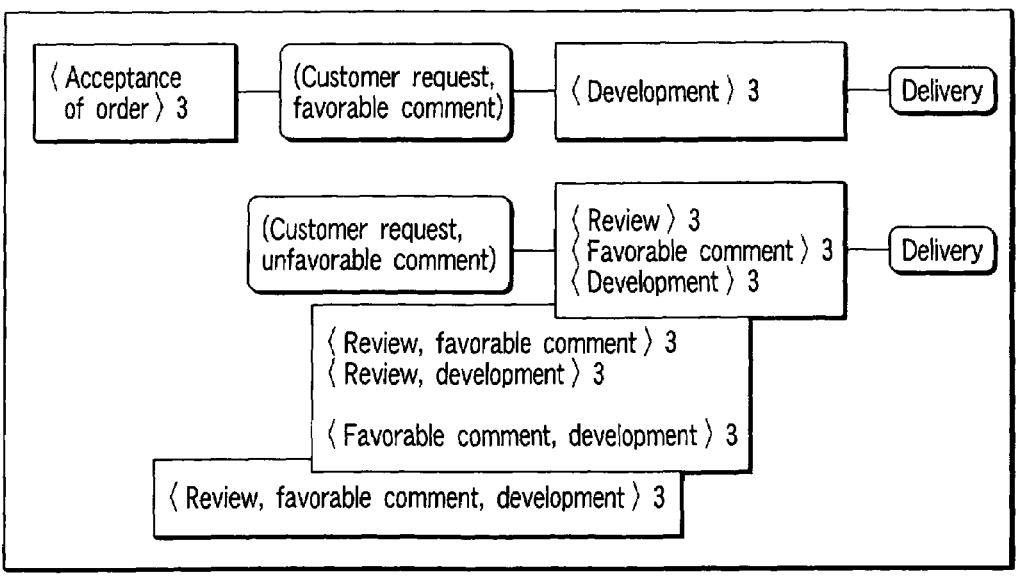
FIG. 47 is a diagram showing partial-sequential pattern extraction (frequency counting of triple-sequential pattern candidates)
Figure 50:
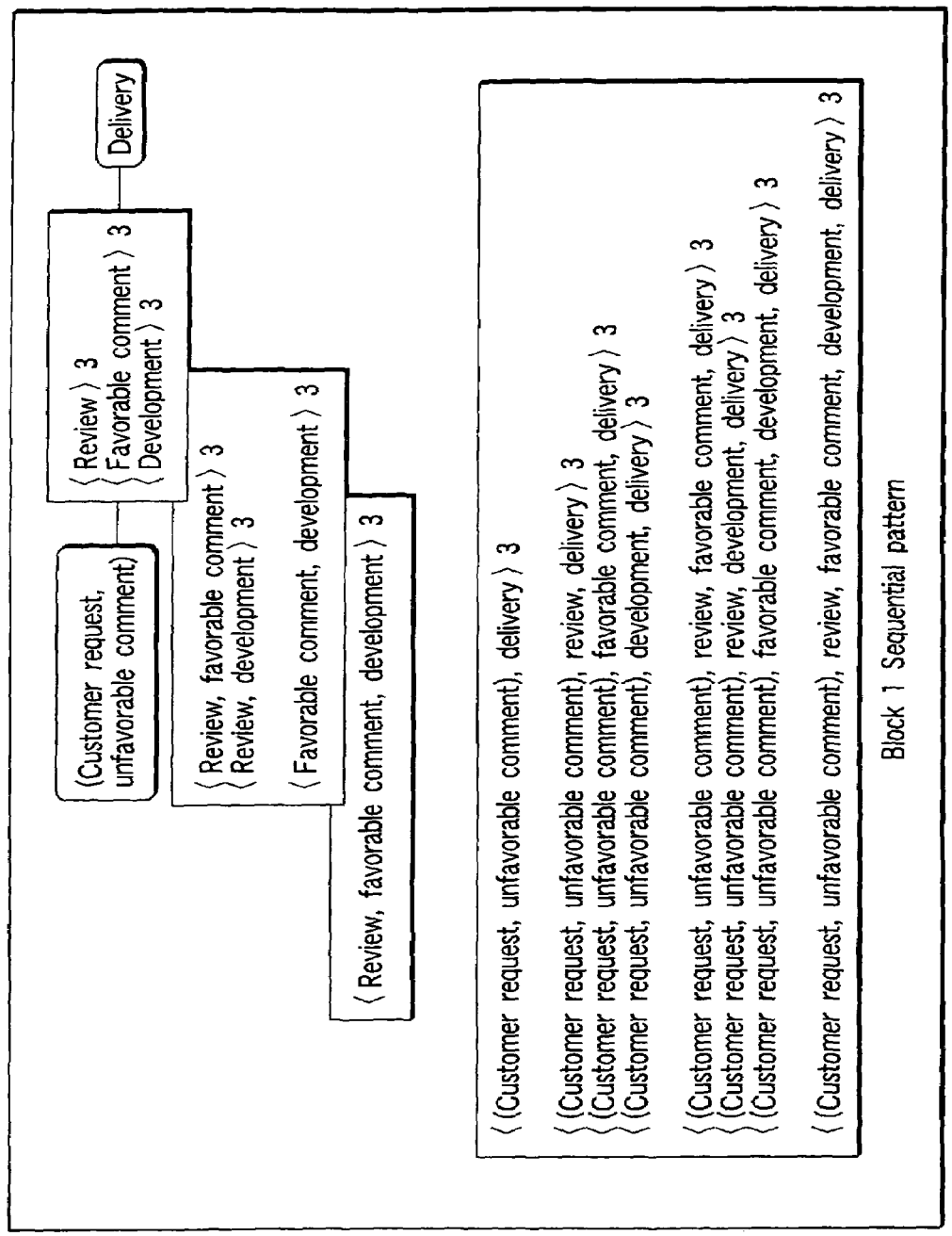
FIG. 50 is a diagram showing a sequential pattern.

FIG. 41 shows a result in which the frequency of appearance of sequential data with sequence length 1 are counted up for every partial-sequential data. For example, <Acceptance of order> in bock 1 of FIG. 41 appears three times in the partial-sequential data in block 1 of FIG. 40. FIG. 42 is a diagram showing sequential data with sequence length 1 which frequently appears for each partial-sequential data. FIG. 43 is a result in which, in each partial sequence, sequential data with sequence length 2 are generated by carrying out self-joined among sequential data with sequence length 1, and frequency counting is carried out. FIG. 44 is a diagram showing only sequential pattern candidates which are sequential data whose frequency of appearance is greater than or equal to the minimum support. FIG. 45 is an example in which sequential data with sequence length 3 are generated due to sequential data with sequence length 2 in which the items except for the last items coincide with one another being made to be self-joined in such a way that a combination of the last items is added to the tail end of the sequential data except for the last item. For example, <Review> is the same in <Review, favorable comment> and <Review, development>. Here, provided that two of <Favorable comment, development> and <Development, favorable comment> which are the combinations of the last items <Favorable comment> and <Development> are added to <Review>, two sequential data with sequence length 3 of <Review, favorable comment, development> and <Review, development, favorable comment> are generated. Note that, here, a method of self-join in which the same item is able to continue is used. FIG. 46 is an example in which the frequency of appearance of sequential data with sequence length 3 on which pruning has been carried out is counted. Pruning is processing in which sequential data which is not structured from sequential pattern candidates with sequence length less by 1 is eliminated from the sequential pattern candidates as infrequently-appearing sequential data without carrying out frequency counting. For example, with respect to <Review, development, development>, since <development, development> is not a sequential pattern candidate with sequence length 2, pruning is carried out, and <development, development> is eliminated from the sequential pattern candidates without carrying out frequency counting. FIG. 47 is an example in which sequential pattern candidates with up to sequence length 3 are shown. FIG. 48 is an example in which sequential data with sequence length 4 is generated due to the sequential data with sequence length 3 being made to be self-joined in the same way as the self-join processing among the sequential data with sequence length 2. Since the sequential data with sequence length 4 is determined to be infrequently-appearing on the basis of pruning, the partial-sequential pattern extraction is completed. FIGS. 49 and 50 are diagrams in which sequential patterns extracted at a point in time the partial-sequential pattern extraction processing is completed are sorted out for each constraining sequential data. Since there is a partial-sequential pattern corresponding to <(Customer request, unfavorable comment), delivery> in FIG. 50 only between <(Customer request, unfavorable comment> and <delivery>, all the sequential patterns have been extracted in this point in time.

Next, at step 5 (merge partial-sequential patterns), a sequential pattern is extracted by merging partial-sequential patterns and constraining sequential data which are separately extracted. The merging processing can be carried out for every constraining sequential data. The number in which merged sequential data formed by combining constraining sequential data and a plurality of partial-sequential patterns appears in the sequential data including constraint stored at step 2 is counted up, and merged sequential data having a support greater than or equal to the minimum support are extracted as a sequential pattern. FIG. 51 is a result in which frequency counting is carried out by combining respective partial-sequential patterns in order to find a sequential pattern corresponding to the constraining sequential data <(Customer request, favorable comment), delivery>. First, <Acceptance of order, (customer request, favorable comment), development, delivery> is generated by combining <Acceptance of order>, <(customer request, favorable comment)>, <development>, and <delivery> so as to maintain the order thereof from the partial-sequential pattern of block 1. Block 2 is sequential data including constraint corresponding to <(Customer request, favorable comment), delivery>. Block 3 is a result of frequency counting of generated sequential data in the sequential data including constraint of block 2, and since the support is greater than the minimum support, it is extracted as a sequential pattern. FIG. 52 is a diagram in which all the extracted sequential patterns are sorted out.

In the above sequential pattern extraction processing, more favorable results can be obtained by carrying out parallel processing by a plurality of processors or distributed processing by a plurality of calculators. In particular, the partial-sequential pattern extraction processing at step 4 can be carried out for every divided sequential data, and is suitable for parallel processing and distributed processing.

As described above, in accordance with the sequential pattern extracting apparatus of the second embodiment, a sequential pattern is extracted from only sequential data satisfying the sequential data constraint. Thus, a processing time can be shortened by greatly reducing unnecessary processing, and sequential patterns including specified sequential data can be extracted without omission.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sequential pattern extracting apparatus which extracts a sequential pattern frequently appearing in a plurality of sequential data each including items, comprising:

a first storage device to store constraining sequential data expressing sequential data which a sequential pattern to be extracted must include;

a generating device configured to generate a sequential pattern candidate set from the plurality of sequential data, the sequential pattern candidate set including a plurality of sequential pattern candidates each including sequential data;

a second storage device to store the sequential pattern candidate set;

a first elimination device configured to eliminate sequential pattern candidates which do not satisfy sequential pattern candidate conditions from the sequential pattern candidate set stored in the second storage device, the sequential pattern candidate conditions specifying inclusion relations of the items between the sequential data included in the sequential pattern candidates and the constraining sequential data; and an extracting device configured to extract the sequential pattern including the constraining sequential data from the sequential pattern candidate set remaining in the second storage device.

2. The sequential pattern extracting apparatus according to claim 1, wherein the generating device is configured to generate the sequential pattern candidate set by self-join of a sequential pattern candidate set that has already been generated.

3. The sequential pattern extracting apparatus according to claim 1, further comprising a second elimination device configured to eliminate sequential pattern candidates including sequential data already determined to be infrequently-appearing from the second storage device when sequence lengths of sequential pattern candidates that are generated by the generating device are 3 or more.

4. The sequential pattern extracting apparatus according to claim 1, wherein the generating device includes a sorting device configured to sort the sequential pattern candidates in order of:
   (1) sequential pattern candidates which are included in a constraining sequential data set;
   (2) sequential pattern candidates with high frequency of appearance in the constraining sequential data set; and
   (3) sequential pattern candidates in which the number of item sets at the same order position is large.

5. The sequential pattern extracting apparatus according to claim 1, wherein the sequential pattern candidate conditions specify:
   (a) sequential data structuring the sequential pattern candidates include the constraining sequential data completely;
   (b) all items remaining after items of constraining sequential data which coincides with items except for an item at one end of sequential data structuring the sequential pattern candidates are eliminated from the constraining sequential data, are included in the item at the one end of one candidate in a sequential pattern candidate set in which all items except for the item at the one end coincide with one another; and
   (c) there are sequential data satisfying one of the (a) and (b) in a sequential pattern candidate set in which all items except for the item at the one end coincide with one another.

6. The sequential pattern extracting apparatus according to claim 1, further comprising a classification device configured to classify the plurality of sequential pattern candidates generated by the generating device such that all items except for the item at the one end of respective sequential data expressing a plurality of sequential pattern candidates in one sequential pattern candidate set coincide with one another.

7. The sequential pattern extracting apparatus according to claim 1, wherein the second storage device includes one of a hash-tree, a trie, and a B-tree in which the plurality of sequential pattern candidates generated by the generating device are stored in accordance with an array of items.

8. A method for operating a sequential pattern extracting apparatus which extracts a sequential pattern frequently appearing in a plurality of sequential data each including items, comprising:

storing constraining sequential data expressing sequential data which a sequential pattern to be extracted must include by a first storage device;

generating a sequential pattern set from the plurality of sequential data by a generating device, the sequential pattern set including a plurality of sequential pattern candidates each including sequential data;

storing the sequential pattern set in a second storage device;

eliminating sequential pattern candidates which do not satisfy sequential pattern candidate conditions from the sequential pattern candidate set stored in the second storage device by a first elimination device, the sequential pattern candidate conditions specifying inclusion relations of the items between sequential data included in the sequential pattern candidates and the constraining sequential data; and extracting the sequential pattern including the constraining sequential data from the sequential pattern candidate set remaining in the second storage device by an extracting device.

9. The method according to claim 8, further comprising generating the sequential pattern candidate set by self-join of a sequential pattern candidate set that has already been generated.

10. The method according to claim 8, further comprising eliminating sequential pattern candidates including sequential data already determined to be infrequently-appearing from the second storage device when sequence lengths of sequential pattern candidates that are generated by the generating device are 3 or more.

11. The method according to claim 8, further comprising sorting the sequential pattern candidates generated by the generating device, in order of:
   (1) sequential pattern candidates which are included in a constraining sequential data set;
   (2) sequential pattern candidates with high frequency of appearance in the constraining sequential data set; and
   (3) sequential pattern candidates in which the number of item sets at the same order position is large.

12. The method according to claim 8, wherein the sequential pattern candidate conditions specify:
   (a) sequential data structuring the sequential pattern candidates include the constraining sequential data completely;
   (b) all items, remaining after items of constraining sequential data which coincides with items except for an item at one end of sequential data structuring the sequential pattern candidates are eliminated from the constraining sequential data, are included in the item at the one end of one candidate in a sequential pattern candidate set in which all items except for the item at the one end coincide with one another; and
   (c) there are sequential data satisfying one of the (a) and (b) in a sequential pattern candidate set in which all items except for the item at the one end coincide with one another.

13. The method according to claim 8, further comprising classifying the plurality of sequential pattern candidates generated by the generating device such that all items except for the item at the one end of respective sequential data expressing a plurality of sequential pattern candidates in one sequential pattern candidate set coincide with one another, by a classification device.

14. The method according to claim 8, further comprising storing the plurality of sequential pattern candidates generated by the generating device in the second storage device in accordance with an array of items.

15. A program stored in a computer-readable medium for extracting a sequential pattern frequently appearing in a plurality of sequential data each including items, the program comprising:

means for instructing a computer to store constraining sequential data expressing sequential data which a sequential pattern to be extracted must include in a first storage device;

means for instructing the computer to generate a sequential pattern candidate set from the plurality of sequential data, the sequential pattern candidate set including a plurality of sequential pattern candidates each including sequential data;

means for instructing the computer to store the sequential pattern set in a second storage device;

means for instructing the computer to eliminate sequential pattern candidates which do not satisfy sequential pattern candidate conditions from the sequential pattern candidate set stored in the second storage device, the sequential pattern candidate conditions specifying inclusion relations of the items between the sequential data included in the sequential pattern candidates and the constraining sequential data; and means for instructing the computer to extract the sequential pattern including the constraining sequential data from the sequential pattern candidate set remaining in the second storage device.

* * * * *